US009521100B2

(12) United States Patent
Kumar et al.

(10) Patent No.: US 9,521,100 B2
(45) Date of Patent: Dec. 13, 2016

(54) AGGREGATE ELECTRONIC MAIL MESSAGE HANDLING

(71) Applicants: Ankesh Kumar, Palo Alto, CA (US); Aleksey Sergeyevich Nazarov, San Mateo, CA (US)

(72) Inventors: Ankesh Kumar, Palo Alto, CA (US); Aleksey Sergeyevich Nazarov, San Mateo, CA (US)

(73) Assignee: SOCIALMAIL LLC, Palo Alto, CA (US)

( * ) Notice: Subject to any disclaimer, the term of this patent is extended or adjusted under 35 U.S.C. 154(b) by 427 days.

(21) Appl. No.: 14/049,204

(22) Filed: Oct. 8, 2013

(65) Prior Publication Data
US 2015/0100894 A1    Apr. 9, 2015

Related U.S. Application Data

(63) Continuation-in-part of application No. 13/191,412, filed on Jul. 26, 2011.

(51) Int. Cl.
| | |
|---|---|
| *G06F 15/16* | (2006.01) |
| *H04L 12/58* | (2006.01) |
| *G06Q 30/02* | (2012.01) |
| *H04L 29/06* | (2006.01) |
| *H04L 29/08* | (2006.01) |

(52) U.S. Cl.
CPC ........... *H04L 51/22* (2013.01); *G06Q 30/0251* (2013.01); *H04L 12/5825* (2013.01); *H04L 51/04* (2013.01); *H04L 51/32* (2013.01); *H04L 65/403* (2013.01); *H04L 67/22* (2013.01)

(58) Field of Classification Search
CPC ...... H04L 51/22; H04L 12/5825; H04L 67/22; H04L 65/403; G06Q 30/0251; G06Q 30/0201
USPC ........ 709/203, 206, 217, 219; 715/747, 752; 707/755
See application file for complete search history.

(56) References Cited

U.S. PATENT DOCUMENTS

| | | | |
|---|---|---|---|
| 2008/0263603 A1* | 10/2008 | Murray | G06F 17/30017 725/87 |
| 2009/0300036 A1* | 12/2009 | Nagasaki | G06F 17/30038 |
| 2012/0208568 A1* | 8/2012 | Cooley | H04W 4/00 455/466 |
| 2014/0108675 A1* | 4/2014 | Wu | G06F 17/227 709/246 |

(Continued)

*Primary Examiner* — Frantz Jean
(74) *Attorney, Agent, or Firm* — Kokka & Backus, PC

(57) ABSTRACT

Techniques for aggregating one or more electronic mail messages (e.g., a subscribed to email) are described, including receiving at an aggregating domain, electronic mail communicated from another domain, parsing the electronic mail to selectively extract content identifiers for content (e.g., text, images, audio, video, media) included in the electronic mail, generating a tile object from selectively extracted content identifiers, and displaying the tile object on a display grid for viewing by a subscriber (e.g., user) of one or more of the electronic mail messages. A plurality of tiles may be generated for a plurality of different email messages and the display grid may display all or a portion of the plurality of tiles. Electronic mail messages may include a subscription to the aggregating domain that was elected by a user as an option presented by a publisher of a unsubscribe page in response to the user's unsubscribe request.

5 Claims, 24 Drawing Sheets

(56) References Cited

U.S. PATENT DOCUMENTS

2014/0324902 A1* 10/2014 Morris .............. G06F 17/30867
707/766

* cited by examiner

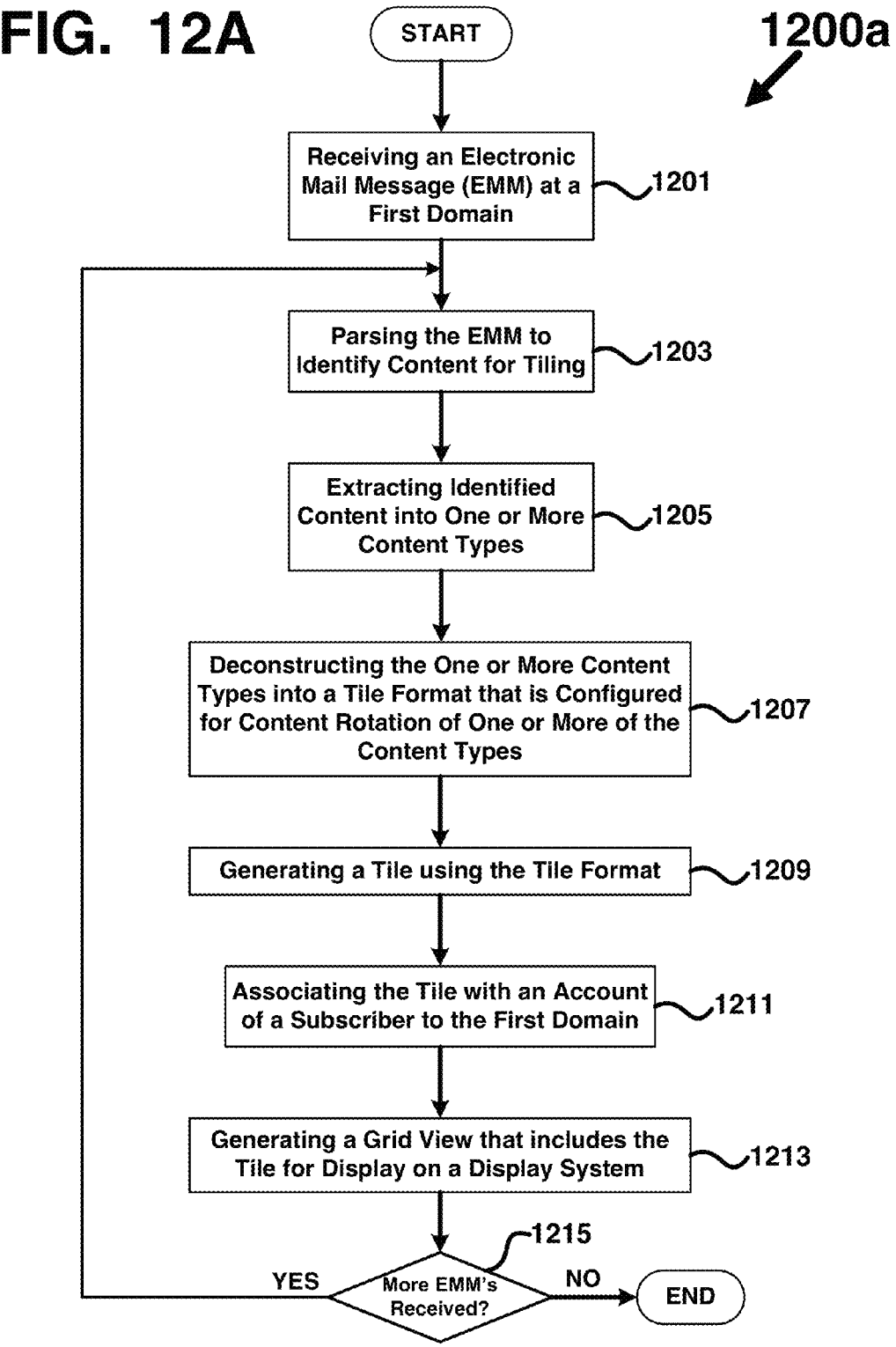

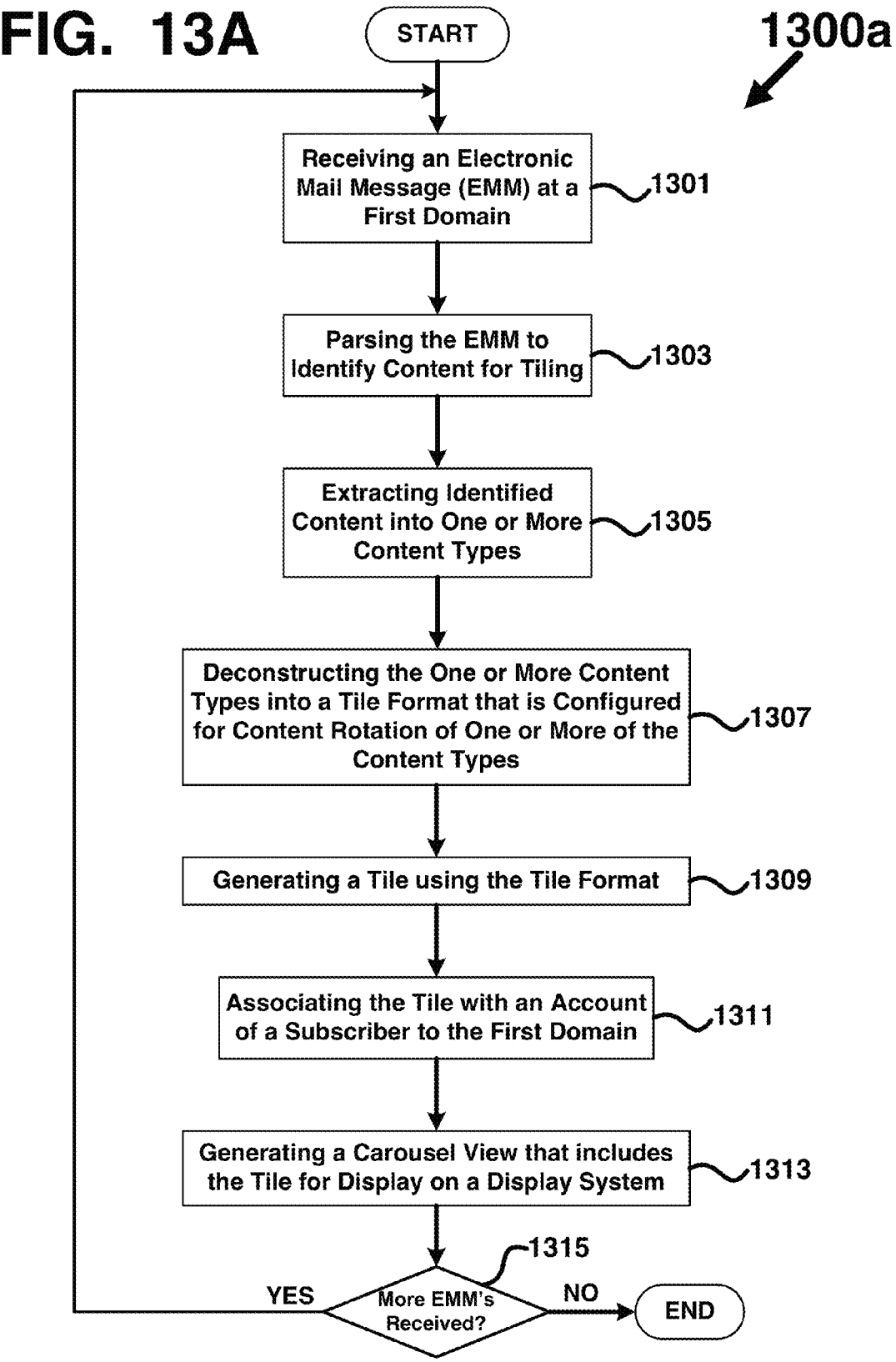

AGGREGATE ELECTRONIC MAIL MESSAGE HANDLING

CROSS-REFERENCE TO RELATED APPLICATIONS

This application is a continuation-in-part of U.S. Non-Provisional patent application Ser. No. 13/191,412, filed on Jul. 26, 2011, which is herein incorporated by reference in its entirety for all purposes.

FIELD

The present application relates generally to computer software, computer program architecture, data and database management, professional media, social media, web based applications, and mobile applications. More specifically, techniques for electronic mail processing and publication for a visual display oriented email system are described.

BACKGROUND

Electronic messaging is an important function for garnering data for personal consumption and for sharing data with other individuals, organizations, or entities. Conventional electronic messaging solutions such as electronic mail (hereafter "email") applications, servers, and platforms allow users to receive email, compose email, forward email, send email, carbon copy (cc) email, blind cc email and reply to email. Moreover, reviewing content included in an email often requires several "click troughs" of a mouse or other user interface device to access the content. For example, one click through may be necessary to open an email in a user's inbox or other email folder, another click through may be necessary to access a web page/site in a hyperlink or image included in a body of the email message. It is estimated that one-third of users are lost for each click through required to access email content. From a user point of view, an inbox or other email folder may contain an overwhelming amount of visual information created by a large number of email messages from a large number of different email sources, such as advertisers, businesses, financial institutions, invoices for bills, newsletters, social networks, professional networks, special interests groups, friends, colleagues and family, just to name a few.

In some instances there may be redundant emails from the same source and/or there may be emails from sources the user is subscribed to but is no longer interested in receiving. In any case, visually parsing through the disparate assembly of email messages and the concomitant click troughs that may be required to access the content of each email may result in the user unsubscribing from an email source or ignoring email from an email source due to the number of required to access content. The unsubscribe requests from users may be regarded as a "churn rate" that is undesirable for a publisher or other source of the email.

On a weekly basis, if a publisher has a 0.3% churn rate, then that publisher may lose 5% of its subscribers on an annual basis with a concomitant loss of revenue to the publisher from advertising, etc. In many cases, the unsubscribing user may actually like the content being provided by the publisher, but is compelled to downsize the amount of emails that he/she is receiving due to an overwhelming amount of emails being received from many disparate sources and the burden of having to visually sort through and decide which emails to react to or to ignore or delete. For example, faced with a large number of emails in an inbox, a user may permanently delete emails they regard as less important. As another example, a user has subscribed to a source of emails (e.g., a newsletter, etc.) and those emails are received in the user's inbox. The user may actually want to receive the subscribed to emails, but doesn't want them in their regular inbox. Due to email overload, the user may elect to unsubscribe from the emails even though they initially subscribed to the emails and may actually still want to receive them.

Conventional presentation of email messages using a subject line format may not convey enough useful information to allow a user to decide whether or not to open the email to divine its content. For example, an email may include text and images; however, the user may not see the image portion until at least one or more click troughs, and the image portion of the content if known without having to click through may be more informative to the user in making a decision to dive further into the content of an email message or to ignore or delete the email message, as opposed to just the text presented in the subject line. In other cases, the visual parsing of a folder or inbox may be fatiguing to a user and result in the user overlooking an email of interest because it is not visually prominent and/or noticeable when presented among other emails in that folder or inbox.

Thus, what is needed is a solution for electronic mail processing and visual presentation to a user that addresses limitations of conventional techniques and/or reduce churn rate.

BRIEF DESCRIPTION OF THE DRAWINGS

Various embodiments or examples ("examples") are disclosed in the following detailed description and the accompanying drawings:

FIG. 12A depicts one example of a flow diagram for generating a grid view including one or more tiles;

FIG. 13A depicts one example of a flow diagram for generating a carousel view including one or more tiles;

It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. Database management systems (i.e., "DBMS"), search facilities and platforms, web crawlers (i.e., computer programs that automatically or semi-automatically visit, index, archive or copy content from, various websites (hereafter referred to as "crawlers")), and other features may be implemented using various types of proprietary or open source technologies, including MySQL, Oracle (from Oracle of Redwood Shores, Calif.), Solr and Nutch from The Apache Software Foundation of Forest Hill, Md., among others and without limitation. The described techniques may be varied and are not limited to the examples or descriptions provided.

Figure 1:
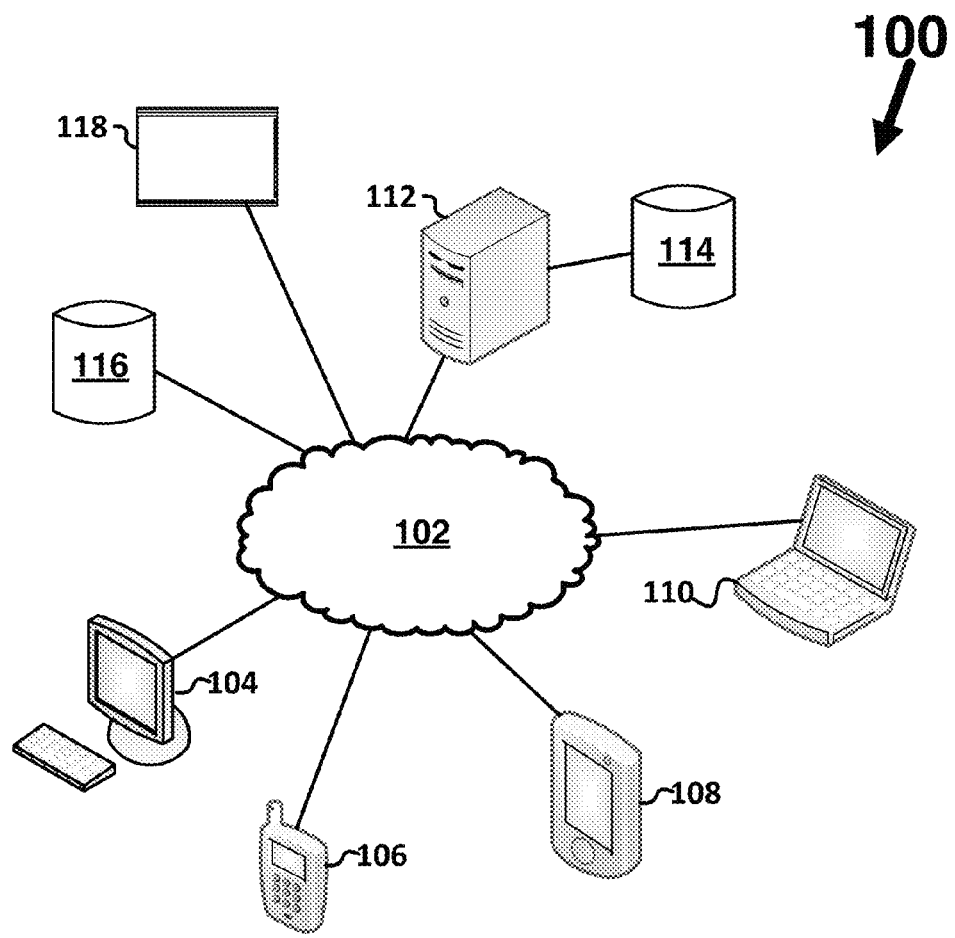
FIG. 1 illustrates an exemplary system for electronic mail processing and publication for shared environments.

FIG. 1 illustrates an exemplary system for electronic mail processing and publication for shared environments. Here, system 100 includes network 102, clients 104-110, server 112, databases 114-116, and website 118. "Elements" may refer to one or more of network 102, clients 104-110, server 112, databases 114-116, and website 118 shown in association with system 100. As shown, the type, quantity, configuration, topology, and other characteristics are provided for purposes of illustration only and may be varied beyond the examples shown and provided. In some examples, network 102 may be any type of data network including, without limitation, a local area network (LAN), wide area network (WAN), municipal area network (MAN), wireless local area network (WLAN), computing cloud, or any other type of aggregation of computing, networking, storage, or processing resources. As shown, clients 104-110 may be implemented as a desktop computer (e.g., client 104), mobile communication (i.e., voice and data) device (e.g., client 106), mobile computing device (e.g., client 108), or notebook or laptop (i.e., portable) computing device (client 110). Each of clients 104-110 may be in data communication with server 112 using network 102. In some examples, server 112 may be a web, application, email, or other type of server, without limitation.

Databases 114-116, in some examples, may be directly or indirectly in data communication with server 112, which may be implemented as described above to perform one or more applications, deliver services or resources to clients 104-110, execute or compile applications, or otherwise provide any type of processing capability or facility, without limitation. Data associated with the techniques described herein may be stored in one or both of databases 114-116. In other examples, data may also be stored in embedded memory, of any type, with server 112 or any of clients 104-110. Still further, data may be stored and retrieved by server 112 or any of clients 104-110 from any of databases 114-116 without limitation as to any given database schema or structure. For example, an email may be transmitted to a "shared destination," which may be an email server (e.g., server 112), email account, or other resource that is configured to accept email messages sent using messaging protocols such as Simple Mail Transfer Protocol (hereafter "SMTP") and received using other protocols such as Internet Message Access Protocol (hereafter "IMAP") or Post Office Protocol (hereafter "POP"), among others. In some examples, email receipt may be indicated automatically or semi-automatically to server 112. In other examples, received emails sent to an email account or client may be retrieved periodically based on a set or irregular schedule. For example, an application hosted and running on server 112 may be configured to retrieve emails for further processing, as described below, on a set schedule (e.g., every 1, 5, 30, 60 minutes, or the like). Using various types of email receipt protocols (e.g., IMAP, POP, or others), emails may be retrieved from an email account or shared destination. Once retrieved by server 112, emails may be stored in database 114 and/or 116 and processed further to generated processed messages for posting to a shared environment (e.g., website 118). As used herein, an email account to which emails are sent for posting in a shared environment may be referred to as a "shared destination."

A shared destination may be, in some examples, an email account hosted on server 112 that is configured to receive emails sent from various sources and intended for posting to a given website (e.g., website 118). Data associated with emails sent to a shared destination may be stored in database 114 or, in other examples, remotely stored in database 116.

As shown here, website 118 may be described as a "shared environment" or facility to which data, information, or other content may be posted or published. As used herein, "posting" or "publication" may be used interchangeably and are intended to refer to the format, transmission, upload, design, layout, and other parameters of content manipulated relative to a given environment (e.g., website 118, among others). In some examples, website 118 may be a website at which emails, attachments, data, information, or other types of content may be viewed, retrieved, posted, or deleted, without limitation. In other examples, system 100 and the above-described elements may be varied in function, structure, configuration, topology, quantity, type, or other aspects and are not limited to the examples shown.

Figure 2:
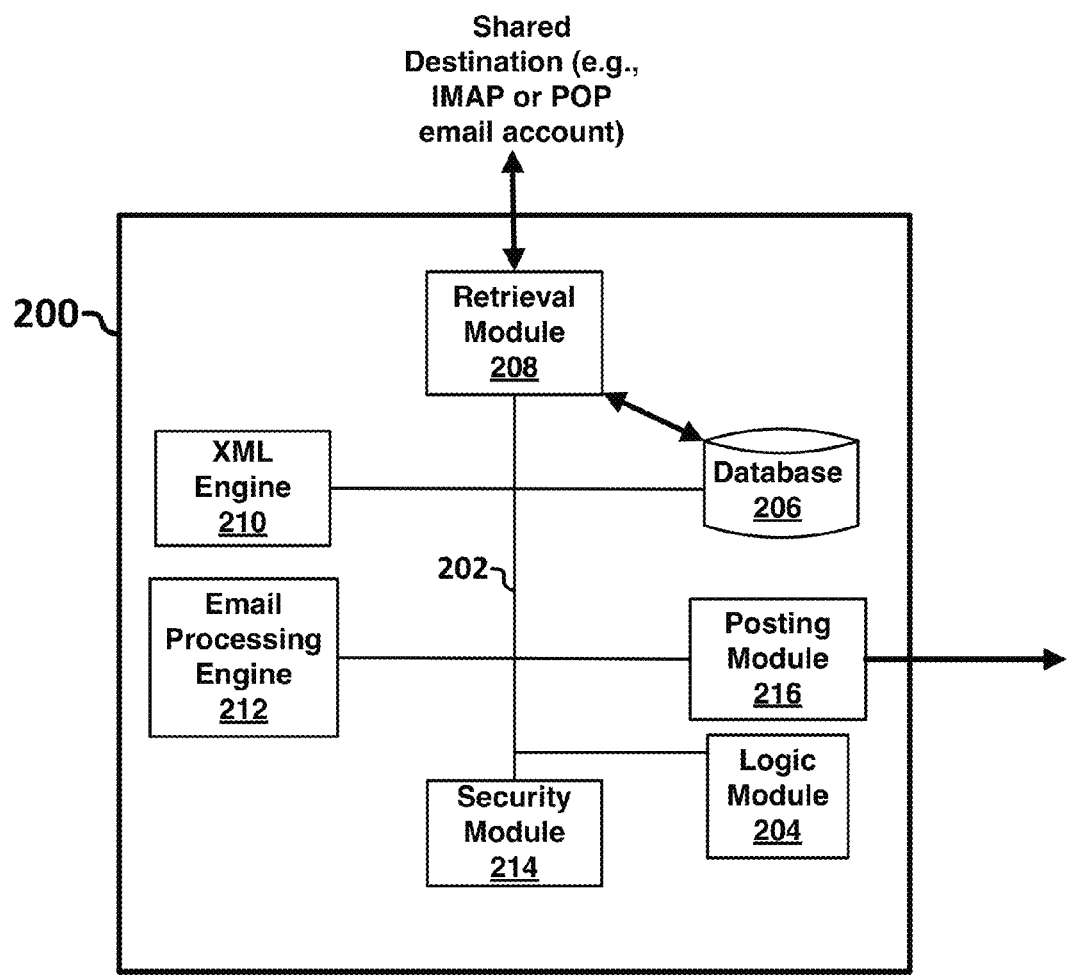
FIG. 2 an exemplary application architecture for electronic mail processing and publication for shared environments.

FIG. 2 an exemplary application architecture for electronic mail processing and publication for shared environments. Here, application 200 includes bus 202, logic module 204, database 206, retrieval module 208, XML engine 210, email processing engine 212, security module 214, and posting module 216. In some examples, bus 202 may be implemented as any type of data communication bus for transferring data between any of logic module 204, database 206, retrieval module 208, XML engine 210, email processing engine 212, security module 214, and posting module 216, without limitation to any given type, configuration, capacity, rating, or other characteristic. As shown, application 200 and the elements described herein (i.e., logic module 204, database 206, retrieval module 208, XML engine 210, email processing engine 212, security module 214, and posting module 216) may be implemented as hardware, software, firmware, circuitry, or a combination thereof and are not limited to any specific application structure or formatting, scripting, or programming language.

In some examples, logic module 204 may be configured to provide command and/or control signals, instructions, and functions to direct one or more of database 206, retrieval module 208, XML engine 210, email processing engine 212, security module 214, and posting module 216. Logic module 204, for example, may direct retrieval module 208 to identify, locate, and retrieve emails sent to a shared destination (e.g., IMAP or POP email account). Logic module 204 may also be configured to process retrieved emails to generate processed messages (i.e., retrieved emails that have been processed by email processing engine 212) for posting or publication in a shared environment (e.g., website 118 (FIG. 1)) prior to being directed to posting module 216 for posting to the shared environment (e.g., website 118). Further, logic module 204 may be configured to evaluate retrieved emails to determine whether a security threat (e.g., malicious software (hereafter "malware"), spyware (i.e., malware intended to passively gather data and information from a host operating system, computer, or application), cross site scripting, and others. Security module 214 may be implemented using various types of security software, firmware, or hardware, such as intrusion detection and prevention systems, anti-virus, or others, without limitation, that are intended to detect whether an email to be processed by email processing engine 212 is a security threat that, once posted to a shared environment (e.g., website 118) may be accessible and pose a security risk to other clients.

As shown, data may be stored in database 206 using any type of database, database schema, or storage mechanism, without limitation, including storage area networks (hereafter "SAN"), network attached storage (hereafter "NAS"), cloud storage, or the like. Further, retrieved emails may be stored using various types of markup and formatting languages such as XML and others. XML engine 210 is an example of a type of facility or resource that may be used to evaluate, format, and generate XML-formatted data to be stored, for example, in database 206 or, as another example, to be processed for posting to a shared environment (e.g., website 118) by email processing engine 212 and posting module 216. In other examples, application 200 may be implemented in any type of application environment, distributed or otherwise, using one or more application servers, computers, or computing platforms from which to host. Apart from the examples shown and described, application 200 and the above-described elements may be varied in function, structure, format, language, configuration, or other aspects and are not limited to any specific implementation.

Figure 3:
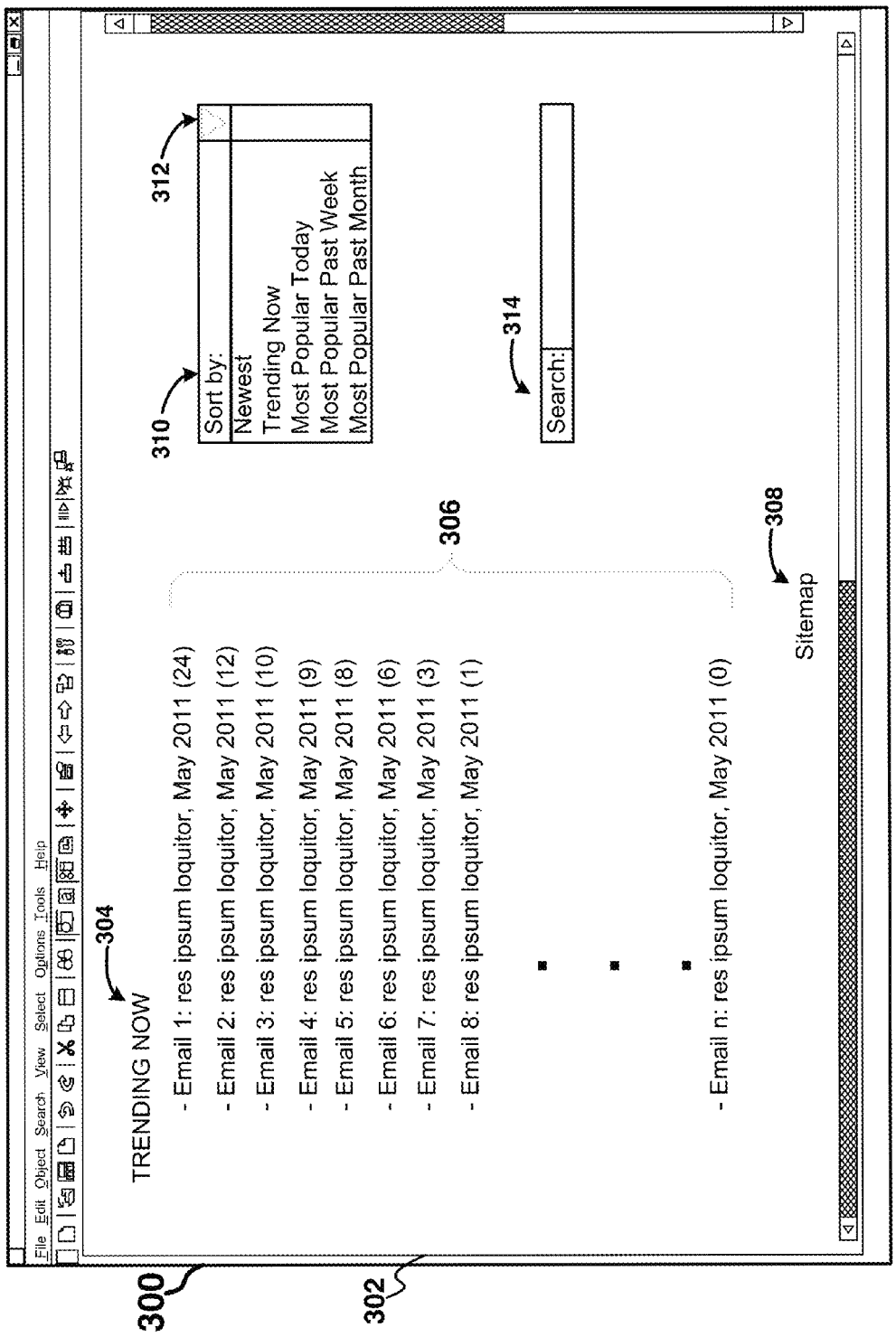
FIG. 3 illustrates an exemplary shared environment for publication of processed electronic mail messages.

FIG. 3 illustrates an exemplary shared environment for publication of processed electronic mail messages. Here, window 300 includes shared environment 302, title tag 304, process messages 306, sitemap link 308, sort window 310, pulldown menu 312, and search field 314. In some examples, window 300 may be representative of a graphical user interface display that is presented by website 118 (FIG. 1). As shown, shared environment 302 may be a graphical display environment in which processed messages may be displayed and reviewed. Based on title tag 304, emails may be listed and displayed based on, for example, popularity (e.g., the number of comments posted in response to a given email posting, most popular today, most popular in past week, most popular in past month, and the like), age (i.e., newest-to-oldest, oldest-to-newest, and the like), trends of immediate interest (i.e., emails that are of immediate interest to the overall user or viewer population), or other factors apart from those described. As used herein, title tag 304 may be a descriptive title or categorical reference associated with a given email and other emails that are contextually or thematically related. In some examples, title tag 305 may use a format such as "<subject line of email>|SocialMail" in order to aid in search engine optimization (hereafter "SEO"). By using the subject line of an email as part of a header tag (e.g., H1 tag), the content, data, or information contained may be used to enhance search engine optimization to allow other users to find and retrieve processed messages 306. By using modifying the header tags of retrieved emails, processed messages 306 can be improved for SEO, facilitating searches performed for various topics, themes, keywords, or emails.

In some examples, the quantity of processed messages may be set to a discrete number per page (e.g., 10 per page, 100, 1000, customizable, user-specified, system-specified, rules-based, and others). Further, when a user navigates to a given page using, for example, a web (i.e., the World Wide Web (hereafter "web")) browsing application processed messages 306 may be sorted based on criteria specified in sort window 310 by using pulldown menu 312. In this example, criteria such as "Newest," "Trending Now," "Most Popular Today," "Most Popular Past Week," and "Most Popular Past Month" may be chosen in order to sort processed messages 306. When selected, a criterion may cause processed shared environment 302 to be rendered such that the order is determined based on the selected criteria. In other examples, posted emails may be ranked using various techniques and, as an example, identified using the "Trending Now" feature. For example, posted emails may be ranked based on determining the number of users to which the posted email has been forwarded (e.g., if a posted email has been forwarded previously multiple times to an aggregate pool of 20 recipients, a quantitative rank may be assigned using various techniques, including assigning a weighted or unweighted ranking value based on the number of recipients (e.g., in the example above, 20)). In other examples, rankings may be performed differently using various techniques or algorithms, without limitation. As an indicator of activity within a service providing window 300, an "activity stream" or other type of feed or data stream may be created in which one or more posted emails, replies, comments, votes, rankings, or other activities occurring may be posted generally for users to view (in some contexts such as within corporate enterprises, this and other features may be suppressed in order to confine the applicability of the described techniques to prescribed enterprise purposes). In some examples, users may opt-in and subscribe to an activity stream in order to ensure that those users who do not elect to receive updates as to activity are not receiving unwanted notifications. In other examples, processed messages 306 may be sorted or displayed differently and are not limited to those shown and described.

Here, processed messages 306 may also be searched using a facility that has an interface such as search field 314 to permit the entry of keywords or other items that may be used to select the appearance of processed messages 306. A search of processed messages 306 may be used to find email content (i.e., content, data, information, media, rich media, text, or the like) from a given pool of emails posted to shared environment 302. When posted, emails may be made "anonymous" (i.e., remove identifying information such as email addresses) in order to protect user privacy, as described in greater detail below in connection with FIG. 5. In some examples, each of processed messages 306 may be treated like an individual post that, when selected, is hyperlinked to another page where related emails of the same topic may be listed, as described below in connection with FIGS. 4A-4B.

Referring back to FIG. 3, shared environment 302 can be provided as a destination website (e.g., website 118) that enables the entry or submission of email content for various types of purposes (e.g., interest, humor, amusement, fun, business, enterprise/corporate, collaborative work sharing, and others, without limitation). Email content may be submitted using shared environment 302 to permit other users to enter comments or submit other emails related to a given topic or original email (i.e., threading), as indicated by title topic 304. Each email submitted may be processed by email processing engine 212 (FIG. 2) to be generated into a processed message and posted as part of a thread.

In other examples, users can view emails associated with topics of various types of interests. Within a corporate organization or enterprise (including for-profit, non-profit, governmental organizations), emails may be submitted for collective sharing and collaborative input by other members of the same organization. Likewise, security module 214 (FIG. 2) may be configured to provide additional security to permit authenticated use by members of a given organization as opposed to enabling shared environment 302 to be publicly accessible. Generally, shared environment 302 may be used as a forum for the sharing of email content that does not require the manual formatting of email content for posting. In other words, a user having an account recorded in one or both of databases 114-116 may forward or send emails to a service hosted by server 112, which may be processed by email processing engine 212 (as described in greater detail below in connection with FIG. 5) and posted to shared environment 302. Once made available to a community (e.g., public, closed, non-public, corporate, enterprise, and the like) of users, other emails may be posted directly to shared environment 302.

Additionally, sitemap link 308 may be used to hyperlink (i.e., linking (i.e., pointing a web browsing application to another address and retrieving and displaying content from that location) to another page of website 118) to another page of website 118 to retrieve and view information associated with posts (i.e., publications) of processed messages to shared environment 302. In some examples, by interacting with sitemap link 308, another web page is rendered that displays a list of processed messages classified by the month and year (i.e., posting date). Each entry of the list of processed messages (not shown) may be hyperlinked to another page that, when invoked, displays another page listing subject lines of individual posted processed messages and an excerpt of the related email. In some examples, the subject lines may also be hyperlinked to the complete post, which is displayed when the links are invoked. In other examples, the above-described examples may be varied in function, structure, format, language, configuration, or other aspects and are not limited to any specific implementation.

Figure 4A:
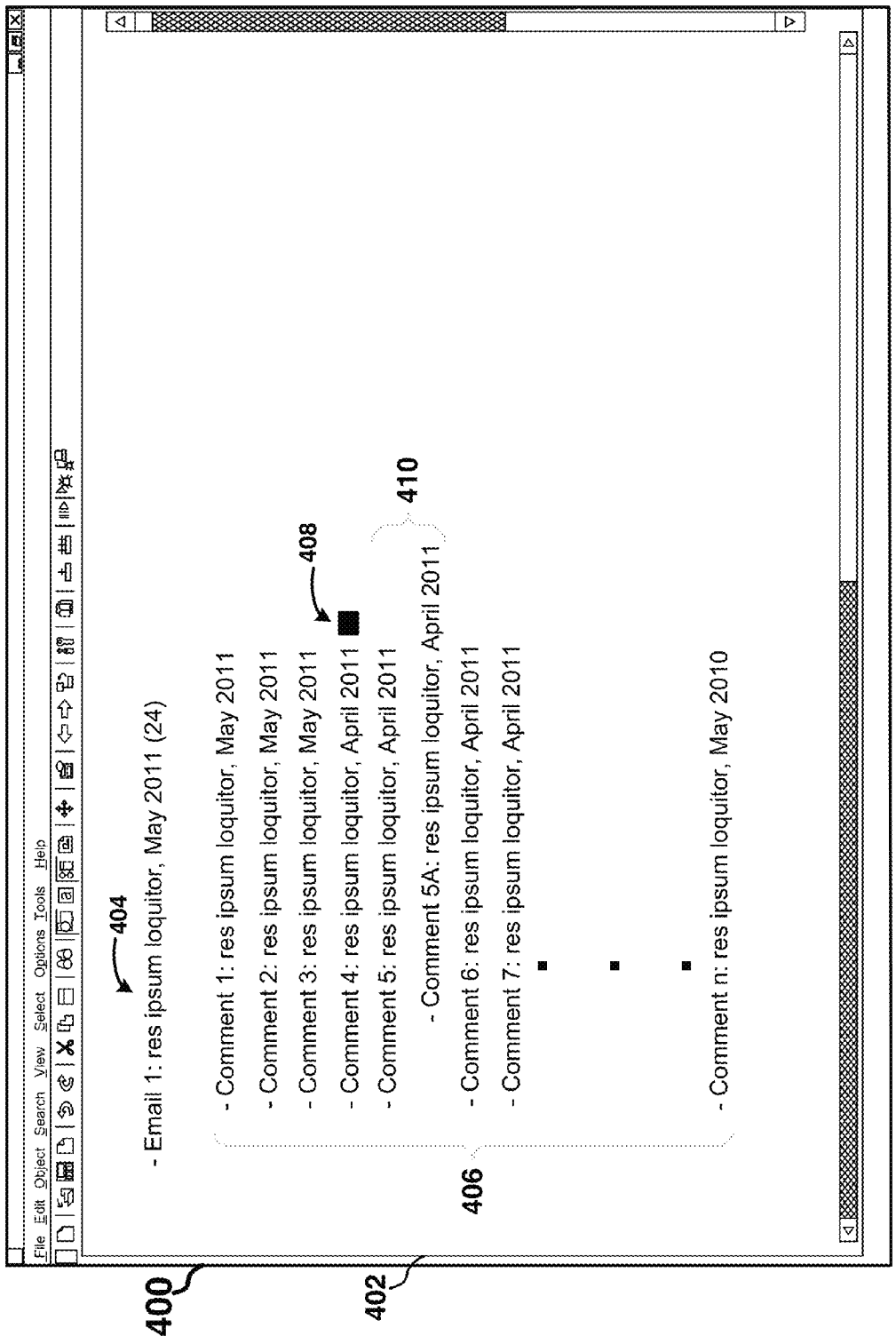
FIG. 4A illustrates a further exemplary shared environment for publication of processed electronic mail messages.

FIG. 4A illustrates a further exemplary shared environment for publication of processed electronic mail messages. Here, window 400 includes shared environment 402, title tag 404, processed messages 406, attachment icon 408, and threaded messages 410. As shown, if a hyperlink associated with one of processed messages 306 (FIG. 3) is invoked another web page may be rendered similarly to that presented in window 400. In some examples, a processed message and related processed messages may be presented in shared environment 402. A selected processed message may be indicated by title tag 404 and subsequent processed messages submitted in response or in relation to title tag 404 may be presented as a thread, as shown by processed messages 406. Further, one or more of processed messages 406 may have an attachment (i.e., an attached file, document, image, or other data or information), which may be indicated using, for example, attachment icon 408. In other examples, different types of icons, indicators, or indicia may be used to indicate visually or graphically whether an attachment is present. Further, attachment icon 408 may be hyperlinked to enable downloading, opening, viewing, or otherwise interacting with an attachment when a mouse pointer of other human computing interface (i.e., "HCI") or input or input-output device is used to select (i.e., invoke) attachment icon 408. Still further, other emails may be submitted for generation of additional processed messages as extended threads, as shown by threaded messages 410.

As shown, each of processed messages 406 may be hyperlinked and, when invoked, may initiate the instantiation and rendering of another window that displays data, information, or other content associated with the selected processed message. As described in greater detail below in connection with FIG. 5, a selected processed message may be configured to direct a web browsing application (not shown) to an address that is associated with another web page that presents content such as the original email of the processed message selected. Some data, information, or content may also be modified in the new window (not shown) in order to provide data security, prevent unauthorized access, or perform other functions that would be beneficial to a collaborative data sharing environment such as shared environment 402. In still other examples, window and shared environment 402 may be implemented differently in layout, design, function, structure, features, or other aspects and are not limited to those shown and provided.

Figure 4B:
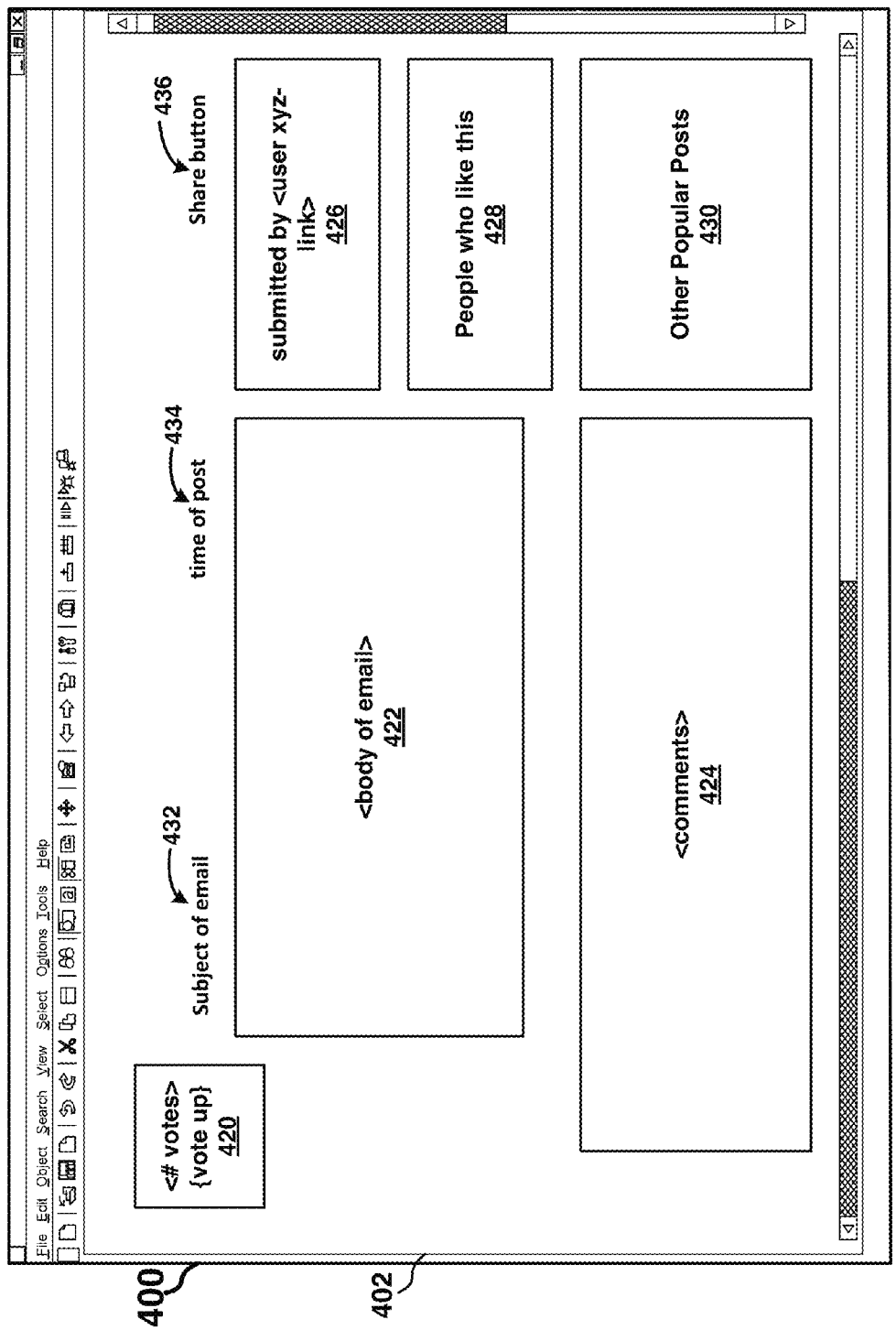
FIG. 4B illustrates an alternative exemplary shared environment for publication of processed electronic mail messages.

FIG. 4B illustrates an alternative exemplary shared environment for publication of processed electronic mail messages. Here, window 400 includes shared environment 402, sections 420-430, data 432-434, and button 436. In some examples, window 400 may be implemented as a graphical user interface such as that associated with a web browser or other web browsing application. As shown window 400 may be configured to present a page that displays several different functions or structures. For example, section 420 may be implemented to present the number of votes associated with a given email that is submitted and posted, as indicated by data 432 (e.g., "Subject of email," which may be identified from a processed email), data 434 (e.g., "time of post," which may also be posted from a processed email), section 422 (e.g., the body of the email, section 426 (e.g., identification of a posting user based on an "anonymized" email address or other user name (e.g., "user xyz," which may be hyperlinked to another page that provides one or more details associated with a given user. Alternatively, when an email is posted, a user may "claim" ownership of a given email by creating a user account, such as that described herein, associated with the sending email address of the posted email.

Further, any email that is posted in window 400 may also include information associated with the number of votes received by other users (e.g., section 420), comments from one or more other users, which may also include replies to comments from the posting email sender (e.g., section 424), people indicating their "like" (or in some examples, dislike (not shown)) of the posted email (e.g., section 428), or related information or data (e.g., other posts that may be related contextually, thematically, by sender, by topic, and others, without limitation) associated with the given posted email (e.g., section 430). In some examples, users may vote for various purposes, including expressing their like, dislike, favor, disfavor, or other action or expression associated with a given posted email. Still further, if a given reader (i.e., user) likes the posted email, she may elect to share the post with another user by using an interactive feature or function such as button 436 that may open another window (not shown), field (not shown), interface (not shown), or the like that permits entry of another user's identifying information (e.g., email address, user name, or the like) in order to share the posted content. As an example, third party applications such as Facebook, Inc. of Menlo Park, Calif., may be coupled to an application implementing the described techniques (including, but not limited to window 400) enabling users (e.g., user xyz) to share the posted content with other users using the third party application (e.g., Facebook, Twitter (as developed by Twitter, Inc. of San Francisco, Calif.), blogs, and other online applications, social media, media, or the like, without limitation). In some examples, users may not have an account with other social media business, websites, or the like. However, the described techniques enable users to post content (e.g., emails) and share them with other users through, for example, an application programming interface (API) to these other websites using posting module 216 (FIG. 2). Referring back to FIG. 4B, users may also have accounts with third party websites and features may be included to enable these users to share content using the described techniques. In other words, the described techniques may be implemented as a service apart from various types of content or social media or entertainment websites, but enable users to share, send, forward, reply to, retrieve, or perform other functions associated with posted emails without requiring the creation of user accounts. As another example, the techniques described herein may be used by individual or organizations such as corporate enterprises.

For example, a corporate enterprise may use the described techniques in order to provide a closed or private (e.g., corporate or in-enterprise) forum or enterprise for its employees to share email content in a collaborative manner. In some examples, corporate employees may post emails using their corporate email addresses. In other examples, corporate employees may post emails using assigned or self-identified user names that mask an individual email address in order to prevent unwanted responsive email or comments to the posted content. In still other examples, by posting emails using the described techniques, various individuals or stakeholders within a corporate organization may be placed on a notice of a given user's posted email without requiring the user to individually and specifically identify various addressees. The described techniques aid in eliminating time and labor-intensive email creation efforts that corporate users often must undergo in order to notify supervisors, managers, executives, co-workers, project team members, and the like.

As shown, various types of purposes may motivate the described techniques for use within a corporate enterprise. In some examples, when a user is included as an addressee on a posted email, she may elect to stop or continue receiving notification of the posted emails, comments, votes, and other actions associated with these. In other examples, posted email subject lines may be used to initiate a discussion forum associated with the given subject. For example, if a subject line states "Sales Contract," the subject line may render the posted email and associated content (e.g., FIG. 4B) available to a user when constructing an email, regardless of whether the user is the original author of the email. In other words, a user can use the described techniques to send an "inline" or in-thread reply or forward the email to another user who is separate and apart from the population having access to the posted email (in some examples, the user may be outside of the corporate enterprise or organization). In still other examples, window and shared environment 402 may be implemented differently in layout, design, function, structure, features, or other aspects and are not limited to those shown and provided.

Figure 5:
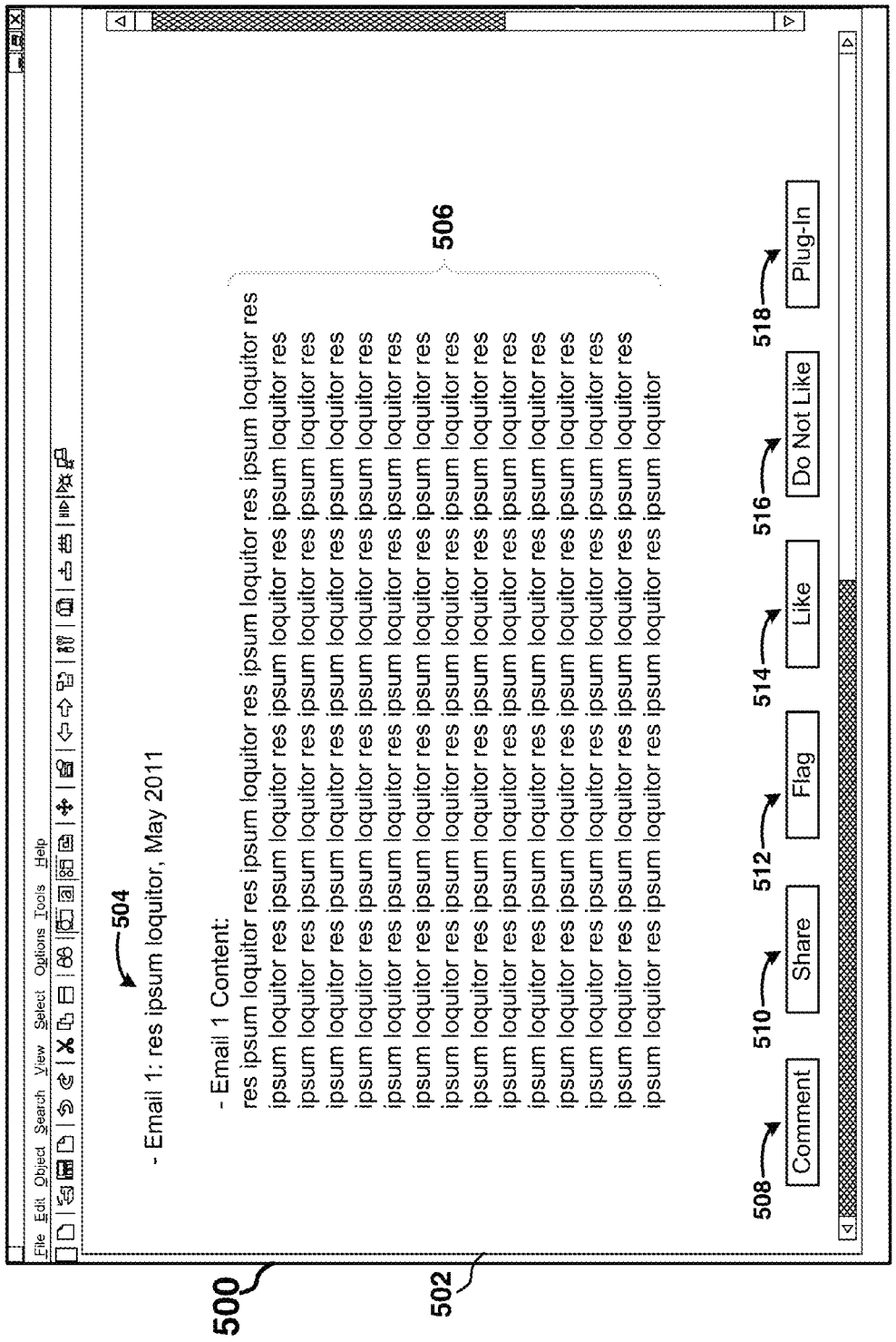
FIG. 5 illustrates another exemplary shared environment for publication of processed electronic mail messages.

FIG. 5 illustrates another exemplary shared environment for publication of processed electronic mail messages. Here, window 500 includes shared environment 502, title tag 504, processed message content 506, comment function 508, share function 510, flag function 512, like function 514, do not like function 516, and plug-in function 518. In some examples, the quantity, type, function, structure, or other aspects of window 500 and the elements shown may be varied and are not limited to those presented, which are provided for purposes of exemplary explanation. As shown, when one of processed messages 406 is selected, a web browsing application or other type of client interface may be opened in window 500, displaying processed message content 506 and indicating it is related to the selected processed message by title tag 504

Further, shared environment 502 may be designed and implemented to provide one or more functions that may be used in connection with processed message content 506. For example, a comment may be entered in association with processed message content 506 by interacting with comment function 508, which may be implemented as a button or link. When selected, comment function 508 may be configured to open a field, form, or altogether new web page in which a user may enter a subsequent comment using a variety of formats. Likewise, if selected, share function 510 may be used to share processed message content 506 with another user by, for example, emailing or using text-based messages via simple messaging service (i.e., "SMS") or another format or protocol. Further, processed message content 506 may also be "flagged" or indicated as being inappropriate, undesirable, copied, or otherwise by invoking flag function 512. Other functions that may be invoked include like function 514 and do not like function 516.

In some examples, if a user "likes" or wishes to publicly indicate her favor for processed message content 506, she may place a tag or mark to indicate such by invoking like function 514. Likewise, she may also invoke do not like function 516 to indicate that processed message content 506 is undesirable to her. By invoking popularity-related functions such as these, ranking of published message content 506 may be performed. As yet another function, plug-in function 518 may be invoked to connect, couple, distribute, publish, send, re-send, or perform other functions associated with a third-party website or service. For example, social media websites that permit user posting of data may provide an application programming interface ("API") that may be used to feed content in a given format for posting or publication. By invoking plug-in function 518, processed message content 506 may be posted to other shared environments such as Facebook (as developed by Facebook, Inc. of Palo Alto, Calif.), LinkedIn (as developed by LinkedIn, Inc. of Mountain View, Calif.), and many other social media-related services, sites, and destinations. In other examples, window 500 and the above-described elements may be implemented differently in layout, design, function, structure, features, or other aspects and are not limited to those shown and provided.

Figure 6A:
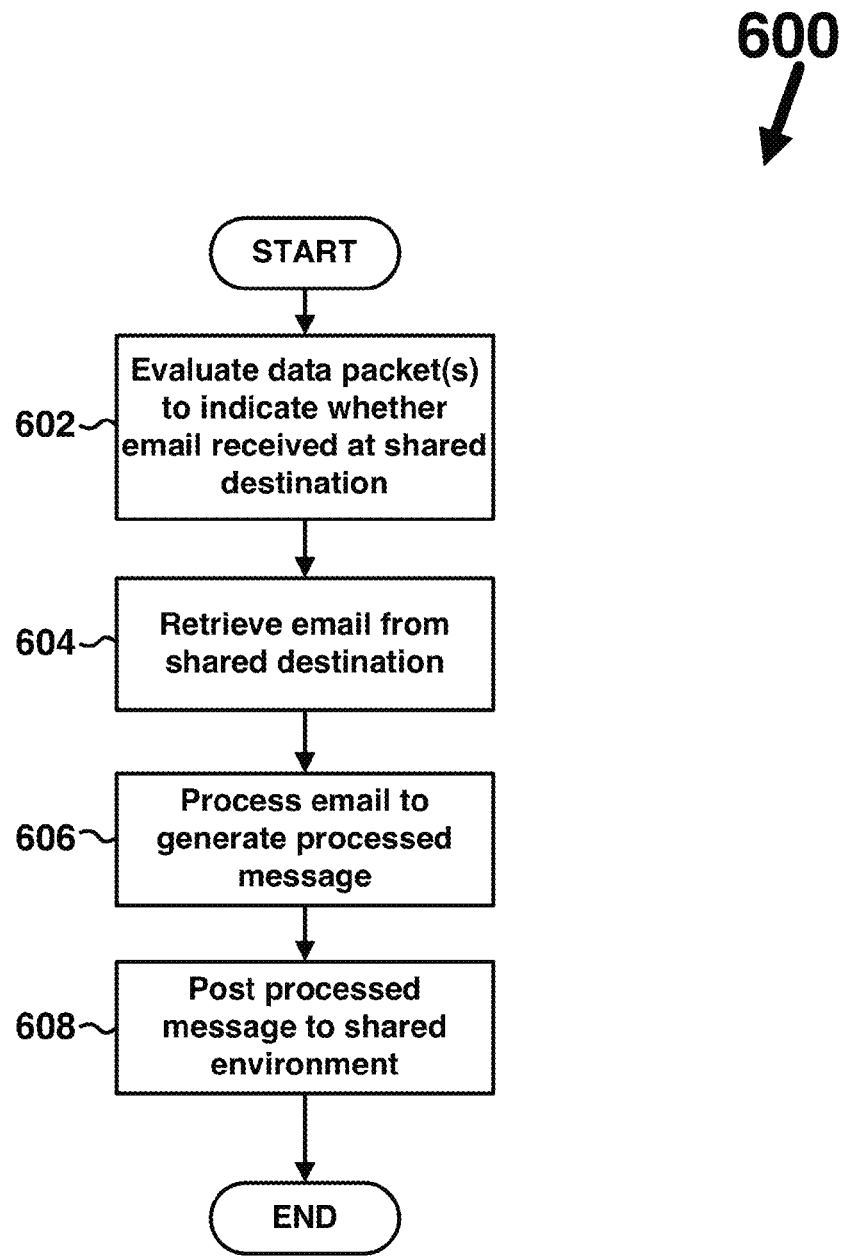
FIG. 6A illustrates an exemplary process for electronic mail processing and publication for shared environments.

FIG. 6A illustrates an exemplary process for electronic mail processing and publication for shared environments. Here, process 600 starts by evaluating one or more data packets associated with an email that is received at a shared destination such as an email account or server (602). Upon detecting, based upon the evaluation of data packets to determine whether mail has been received (using either an IMAP or POP-based protocol), the received email is retrieved (604). Once retrieved, the email is processed to generate a processed message, such as that described above in connection with FIGS. 3-5 (606). Once processed, a processed message is posted to a shared environment such as website 118 (FIG. 1) (608).

As shown, data may be analyzed using various techniques. For example, data packets may be evaluated by analyzing a given domain associated with the sending email address. A corporate enterprise, as an example, may have a given domain (e.g., company.com) that is evaluated in order to provide message visibility to other users having the same domain. This may be implemented in order to provide a service to users and/or accounts within the given domain in order to prevent access to information or data. In other examples, the above-described process may be varied in the implementation, order, function, or structure of each or all steps and is not limited to those provided.

Figure 6B:
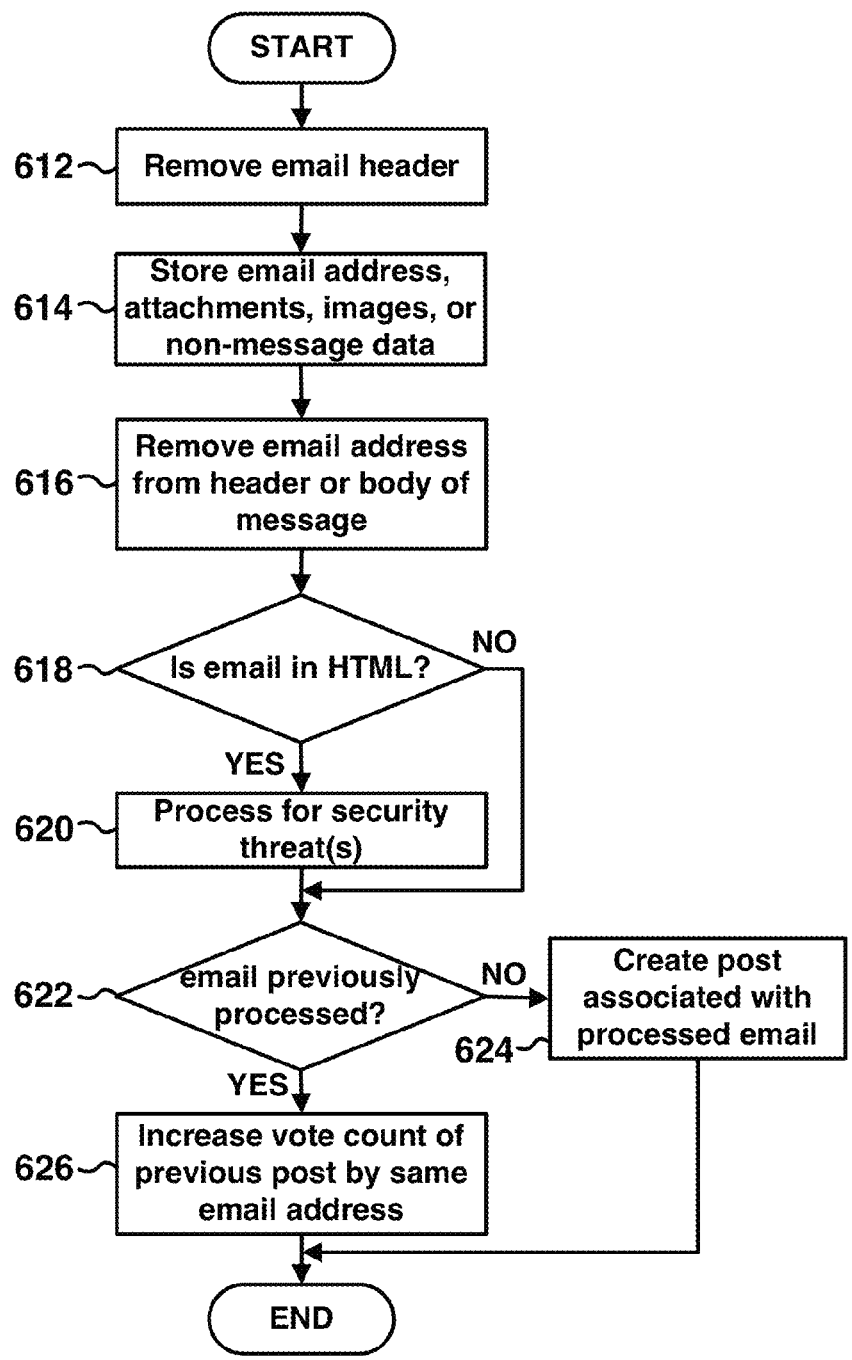
FIG. 6B illustrates an alternative exemplary process for electronic mail processing and publication for shared environments.

FIG. 6B illustrates an alternative exemplary process for electronic mail processing and publication for shared environments. Here, process 610 begins by processing an email submitted using the described techniques by removing email headers, which may include one or more email addresses (e.g., sender, destination, intermediate (i.e., email addresses found within a thread of emails such as a forward or chain of multiple replies, and the like) (612). For privacy, security, and other similar reasons, source-identifying information such as email addresses may be removed. In some examples, a received email may be processed for privacy reasons by parsing data associated with the posted email. The email address may be stored along with any non-message data, which may include attachments or embedded images of any kind or format (614). Non-message data, in some examples, may also be identified as any type of information or data that is not related to the message body. In other examples, non-message data may be any data that is not found within the payload of a message body. In still other examples, data to be stored in a database (e.g., database 206 (FIG. 2)) may be determined differently. The email address is then processed to identify any email addresses within the header or the body, which may be stored as fields or records associated with the sending email address in a database (616). A determination is made as to whether the email being processed is in HTML (i.e., Hyper Text Markup Language) or an HTML-based format (618). If the email being processed is in HTML or an HTML-based format (e.g., XHTML, DHTML, XML, and others, without limitation), then the email is processed for security threats (e.g., virus, malware, spyware, cross-site scripting, and others, without limitation) (620). If the email is not in HTML or an HTML-related format, then process 610 does not perform a security check.

In some examples, a check may be performed to determine whether the email being processed was previously processed (622). If the email was not previously processed, a new post with the email should be created (624). If the email was previously processed, in some examples, a vote count associated with the email may be incremented or increased. In other examples, the above-described process may be performed or implemented differently in steps, order, function, or other aspects, without limitation to those provided.

Figure 7:
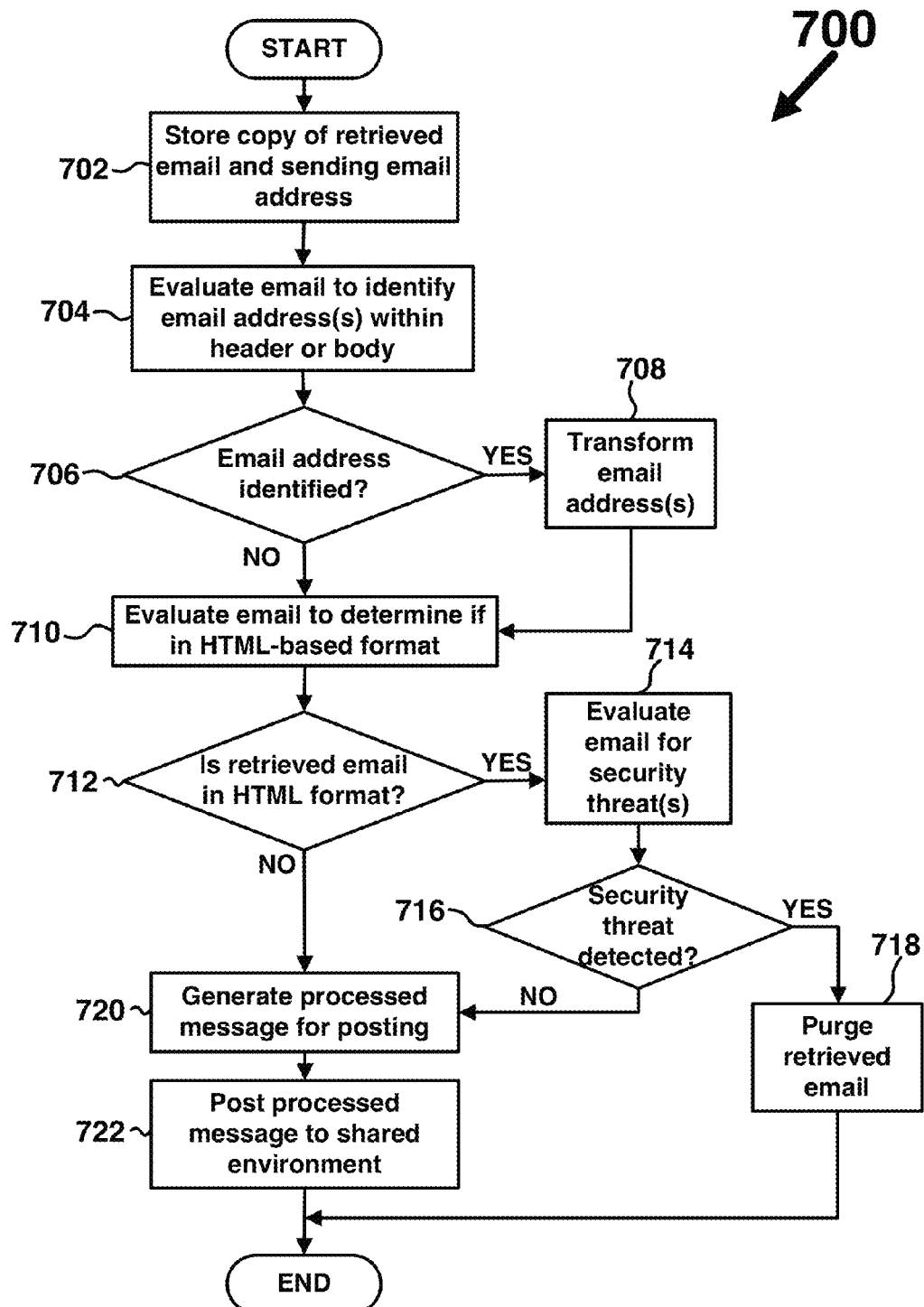
FIG. 7 illustrates a further exemplary process for electronic mail processing and publication for shared environments.

FIG. 7 illustrates a further exemplary process for electronic mail processing and publication for shared environments. As an exemplary illustration of generating processed messages, process 700 may be implemented. Here, process 700 starts by storing a copy of a retrieved email and recording the email address of the sending account or client (702). After storing in database 114 and/or 116 (FIG. 1) a copy of the retrieved email and email address of the sending account or client, the retrieved email is evaluated to identify whether there are email addresses within the header or body (i.e., payload) data of the email (704). A determination is made as to whether any email addresses are identified (706). If an email address is identified in either the header or body of the retrieved email, then the identified email addresses are transformed, which is described in greater detail below in connection with FIG. 8 (708).

Referring back to FIG. 7, if no email address is identified, then the retrieved email is further processed by evaluating the format of the email to determine whether it is in an HTML-based format (710). A determination is made as to whether the retrieved email is in an HTML-based format (712). If the email is in an HTML-based format, then it is further evaluated for security threats such as cross site scripting and others as described above (714). A determination is made as to whether a security threat is present (716). If a security threat is identified, then the retrieved email is purged and not stored in database 114 and/or 116 (718). In other examples, an alert message or other warning may be sent to the user of system 100 (FIG. 1) to indicate that a security threat was found. If no security threat is found, then a processed message is generated using the transformed email addresses (720). After generating a processed message, it may be posted to a shared environment (e.g., website 118 or shared environments 302 (FIG. 3), 402 (FIG. 4), or 502 (FIG. 5)) (722). In other examples, the above-described process may be varied in the implementation, order, function, or structure of each or all steps and is not limited to those provided.

Figure 8:
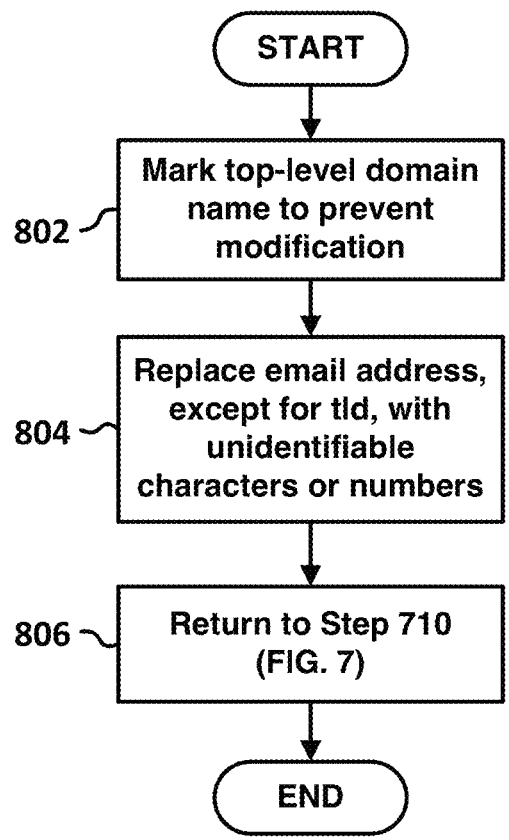
FIG. 8 illustrates an exemplary process for transforming email addresses for electronic mail processing and publication for shared environments.

FIG. 8 illustrates an exemplary process for transforming email addresses for electronic mail processing and publication for shared environments. Here, process 800 beings by marking or otherwise indicating a top-level domain (hereafter "TLD") associated with the email in order to prevent modification (i.e., transformation) as described herein (802). After marking or indicating the TLD associated with the email, all other characters associated with the domain name are replaced with unidentifiable characters or numbers (804).

For example, an email address "joe@smith.com" may be transformed by marking the ".com" for non-modification and replacing "joe@smith" with unidentifiable characters such as "xxx@xxxxx." Thus, the email address in the example above may be transformed from "joe@smith.com" to "xxx@xxxxx.com." After transforming identified email addresses in the header or body (i.e., payload data) of a retrieved email message, the process then returns to step 710 (FIG. 7) to continue processing for generating a processed message (806). In other examples, the above-described process may be varied in the implementation, order, function, or structure of each or all steps and is not limited to those provided.

Figure 9:
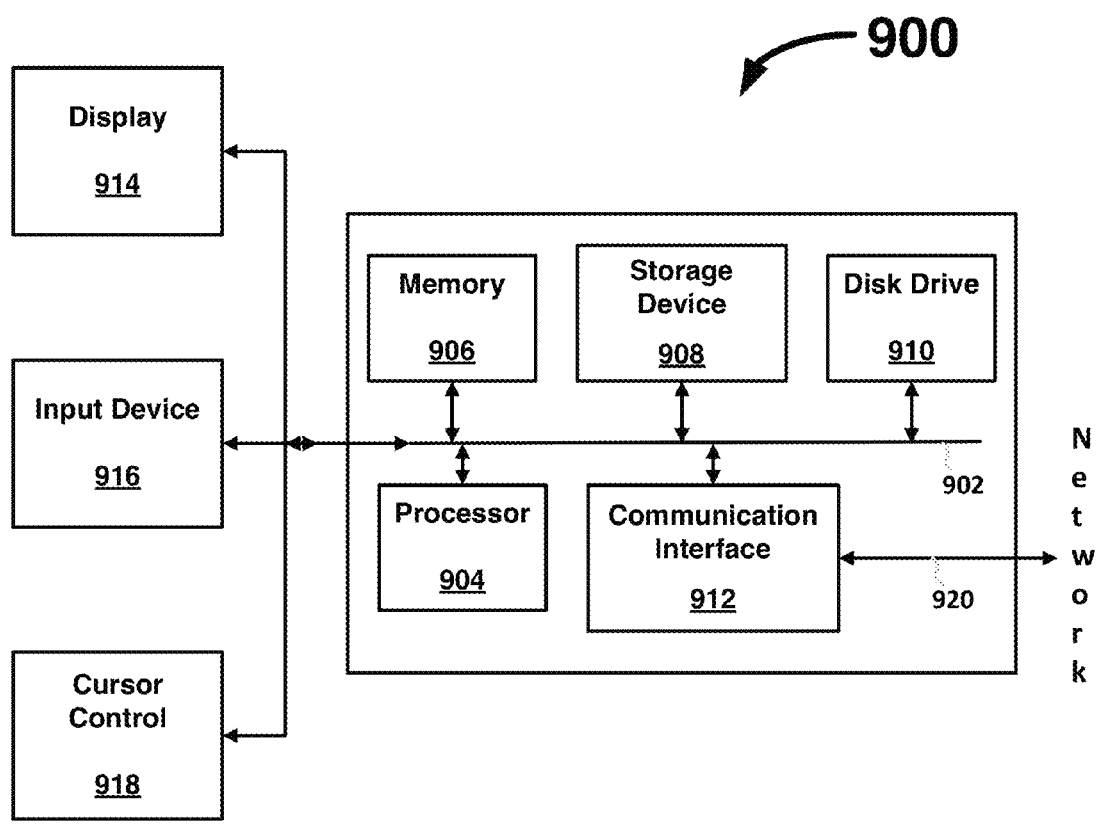
FIG. 9 illustrates an exemplary computer system suitable for electronic mail processing and publication for shared environments.

FIG. 9 illustrates an exemplary computer system suitable for electronic mail processing and publication for shared environments. In some examples, computer system 900 may be used to implement computer programs, applications, methods, processes, or other software to perform the above-described techniques. Computer system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), and cursor control 918 (e.g., mouse or trackball).

According to some examples, computer system 900 performs specific operations by processor 904 executing one or more sequences of one or more instructions stored in system memory 906. Such instructions may be read into system memory 906 from another computer readable medium, such as static storage device 908 or disk drive 910. In some examples, hard-wired circuitry may be used in place of or in combination with software instructions for implementation.

The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks, such as disk drive 910. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by a single computer system 900. According to some examples, two or more computer systems 900 coupled by communication link 920 (e.g., LAN, PSTN, or wireless network) may perform the sequence of instructions in coordination with one another. Computer system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution.

Figure 10:
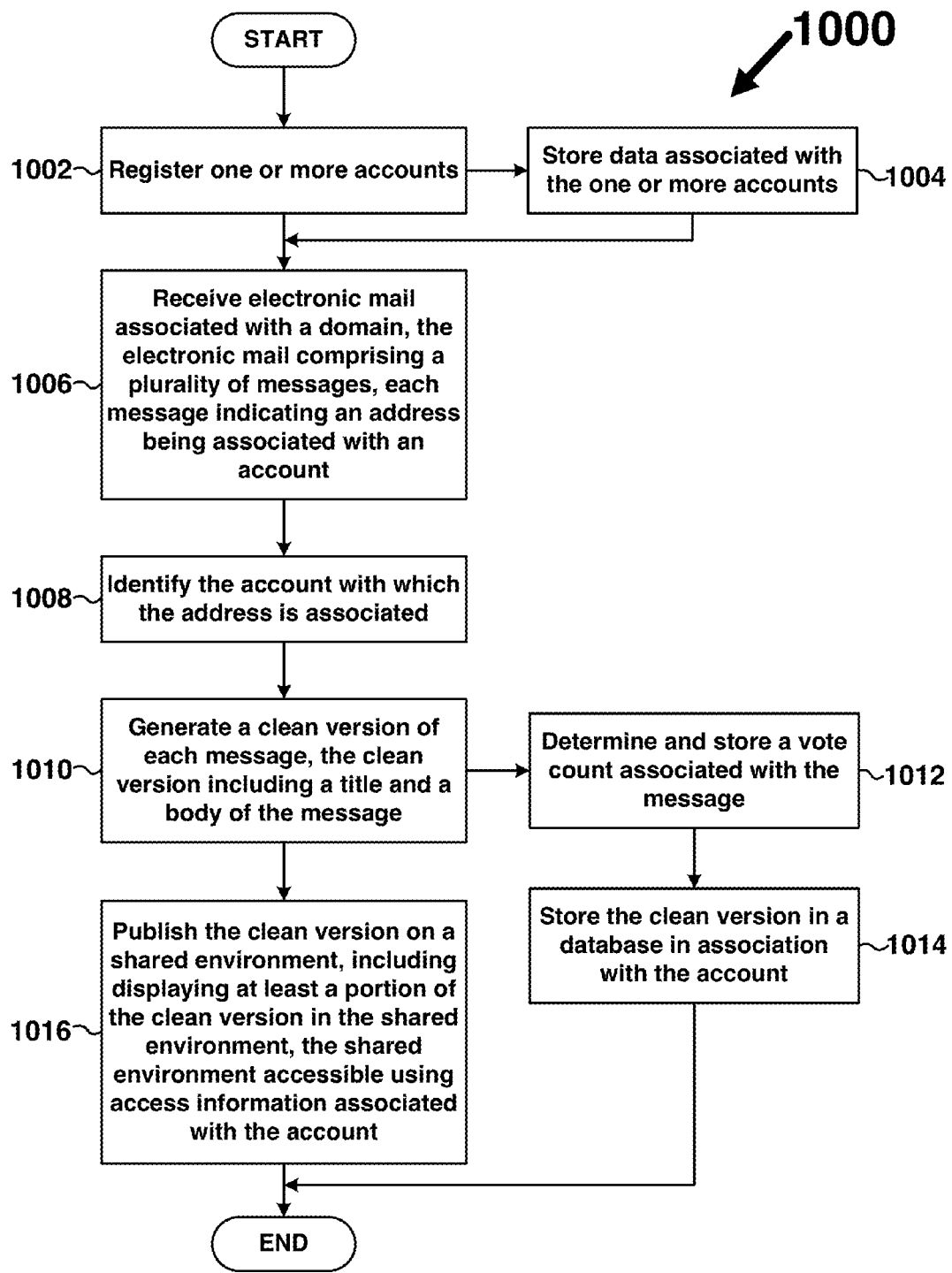
FIG. 10 illustrates an exemplary process for aggregating and cleaning electronic mail for publication on shared environments.

FIG. 10 illustrates an exemplary process for aggregating and cleaning electronic mail for publication on shared environments. Here, process 1000 begins with registering one or more accounts (1002). As used herein, an account may be an email account providing an address (i.e., email address) to which email messages (i.e., "messages" or "email") may be sent. For example, the account may be a shared destination, as described herein. In some examples, an account may be associated with a system for electronic mail processing and publication, as described herein. In some examples, an account may be registered for an address to which certain types or categories of email may be sent. For example, a user may register for an account devoted to receiving social emails, email newsletters, marketing or promotional emails, other subscription or opt-in emails, or other types of emails. In some examples, an account may be associated with a user through access information provided by the user during registration of the account. The access information may include one or more of a username, password, pin number, identification image or graphic, passcode, customer number, security questions, and other manners of identification. In some examples, the access information may include a user's access information (e.g., email account information, username, password, or the like) for accessing a previously registered social network account (e.g., an account with Facebook, Twitter, Google+, or other social network service). Data associated with the one or more accounts (e.g., access information, email address, and other information associated with the accounts) may be stored (e.g., in a database, repository, hard disk, or other storage) (1004). In other examples, an account may be registered using new access information created particularly for an electronic mail processing and publication account (i.e., not shared with a social network account). In still other examples, an electronic mail and publication account may be created using an option provided in connection with a sign-up email or webpage for subscription or opt-in email (e.g., newsletters, marketing or promotional emails, or the like). For example, an email or webpage used for signing up for, or opting into, a newsletter or marketing email, may provide a user with an option to create and use an electronic mail and publication account to view and manage those opt-in emails. In some examples, such an option may be provided as a link to an account setup page configured to create an electronic mail and publication account. In yet other examples, an electronic mail processing and publication account may be created through a link from an email sent to a different email account. For example, a content provider (i.e., merchant, marketing firm, or the like), as described below, may provide an option in an unsubscribe (i.e., opt-out or email preferences) window, email or webpage to set up an account with an electronic mail processing and publication account for managing subscription emails (e.g., newsletters, marketing or promotional emails, or other opt-in emails). Using this option, a user may register, or set up, an account with an electronic mail processing and publication account for better management of subscription or opt-in emails, as described herein. Providing this option may decrease the number of users that unsubscribe from receiving content from a content provider. In still other examples, an account may be registered differently and are not limited to those shown and described.

Once the account is registered, electronic mail associated with a domain may be received, the electronic mail comprising a plurality of messages, each message indicating an address being associated with an account (1006). In some examples, the domain may be a single domain, or a set of domains, associated with a system for electronic mail processing and publication. In some examples, a domain may be associated with a plurality of accounts, each account having an address associated with the domain. For example, multiple addresses may have the same domain (i.e., "@socialmail.com"), and a plurality of email messages addressed to one or more addresses associated with a domain, or a set of related domains, may be received by a system for electronic mail processing and publication. In some examples, the electronic mail associated with a domain, or set of domains, may be received, or aggregated, into a "catch all" or general mailbox configured to receive mail sent to multiple email addresses (e.g., a set of email addresses provided by an electronic mail processing system or service, a set of email addresses associated with the same domain, or the like). As used herein, "catch all mailbox" refers to a general mailbox configured to receive and aggregate email from a group, set, or other multiple of, email addresses (e.g., a group of related email addresses, a group of email addresses that share a domain, email addresses associated with a group of related domains, email addresses for a company or other entity, or other groups of email addresses). For example, a catch all mailbox may be configured to receive email sent to all or substantially all email addresses having the same domain, and a Javascript program may be employed to process the contents of the catch all mailbox (i.e., to parse the emails as described below). In other examples, email messages associated with each address may be received into an individual mailbox for the address. In still other examples, different types and numbers of mailboxes may be implemented for receiving email.

In some examples, email messages may be received directly from a content provider (e.g., Responsys®, Constant Contact®, Vertical Response®, or the like) through, for example, an API. As used herein, a content provider may be a merchant, an organization, a collective, a firm, or any other type of entity, engaged in providing information (e.g., advertisements, newsletters, updates, or other marketing materials) to subscribers, or other groups of opt-in recipients, using email. In some examples, an API may be configured to receive messages from content providers and deliver those messages to a user by way of a suitable environment (e.g., shared environment 1102 in FIG. 11, which may avoid incorrectly, improperly, or unnecessarily flagging or filtering a message). In some examples, an API implemented by an application for email processing and publication on shared environments (e.g., application 200 in FIG. 2) may be configured to receive or obtain email, or email content, from a content provider for subscribers having an account associated with the application without using third party email networks or servers, and to bypass one or more filters (i.e., spam filters) implemented by third party email networks or providers. In some examples, such an API may be configured to process data associated with dynamic content (e.g., video, audio, animation, links, interactive content, or the like) for presentation on a shared environment in an intended format, such that a user may view video or animation content, listen to audio, or the like, in a shared environment. For example, such an API may be configured to receive and process data associated with a video to generate output associated with presentation of the video on a tile in a shared environment. In another example, such an API may be configured to receive and process data associated with an image to generate output associated with presentation of the image on a tile in a shared environment. In some examples, some (i.e., multiple) or all messages in a shared environment (e.g., shared environment 1102 in FIG. 11, or the like) may be presented in an "open" format, where some or all contents (i.e., core, essential or cleaned contents (e.g., subject, title, or body of a message, or the like) of a message, including graphics, images, video and other content, may be readily viewed without clicking on a link, list, item, or other feature associated with each message, on a page. In other examples, email may be received through SMTP or other protocols, as described herein.

In some examples, an account may be configured to store (i.e., in database 206 in FIG. 2) and manage a user's email subscriptions. In some examples, the account associated with an application for email processing and publication on a shared environment (e.g., application 200 in FIG. 2) may be configured to retrieve or receive (i.e., using an API, as described herein) subscription emails directly and/or securely from content providers to which the account is subscribed, and to filter and not publish to a shared environment emails from content providers to which the account does not subscribe. For example, emails received for an address may be checked against a stored list of subscriptions for an account associated with the address before publication on a shared environment. In an example, if an email message is received from a content provider to which the account associated with a recipient address is not subscribed, the email message may not be published. In another example, if an email message is received from a content provider to which the account associated with a recipient address is subscribed, the email message will be given a high priority position in a shared environment (e.g., shared environment 1102 in FIG. 11), and if the email message is received from a content provider to which the account is not subscribed, given a low priority position in a shared environment (e.g., shared environment 1102 in FIG. 11).

Once the electronic mail is received, the account with which the address for each message may be identified (1008). In some examples, this may include reading the "To" line, or other recipient information, from a header section to determine the address to which the message is being sent, and matching the address to an account, for example, using a lookup or otherwise searching a database for an account associated with the address (i.e., using Javascript). In other examples, an account with which an address for a message may be identified differently and are not limited to those shown and described.

Once an account is identified, a clean version of each of the messages may be generated, the clean version including a title and a body of the message (1010). As used herein, a "clean version" of a message is one in which a parsing algorithm has cleaned, or removed (i.e., extracted and separately stored), personally identifiable information in the message. As used herein, "personally identifiable information" refers to information that may be used to uniquely identify, contact, or locate a user (e.g., a name, an e-mail address, a phone number, a social security number, driver's license number, other identification number, a biometric signature, or other form of identification). In other examples, sensitive information other than personally identifiable information also may be cleaned from a message. In some examples, personally identifiable or other sensitive information may be identified and cleaned from a message header (e.g., sender, recipient, route, or other header data). In other examples, personally identifiable or other sensitive information may be identified and cleaned from other portions of the message (e.g., body, other content, metadata, or the like). In still other examples, a clean version of a message may be generated differently and is not limited to those shown and described.

In some examples, a vote count associated with the message may be determined and stored (1012). For example, a comparison against previously received email messages may be conducted to determine, or update or increment, a vote count based upon the number of times an identical or substantially identical email message has been sent to other users (i.e., other accounts). In another example, a vote count for a message may be determined, or updated or incremented, based upon a number of times the message has been forwarded from one user to another user. In still another example, a vote count for a message may be determined, or updated or incremented, based upon a number of times the message has been posted, recommended, liked, shared or otherwise acted upon by a user to indicate a preference, or positive impression of, the message (e.g., by clicking a hyperlink to recommend, share or like a message on Facebook, by clicking a hyperlink to share a message on Twitter, by clicking a hyperlink to recommend (i.e., plus one) on Google+, or the like). In some examples, such vote counts may be determined using comparisons of a clean version of a message with data previously stored and associated with identical or substantially identical messages. In some examples, a vote count may be displayed on a shared environment (e.g., shared environment 1102 in FIG. 11), for example, in a tile for a corresponding message. In other examples, a vote count for a message may be determined, updated or incremented, differently and are not limited to those shown and described.

Figure 11:
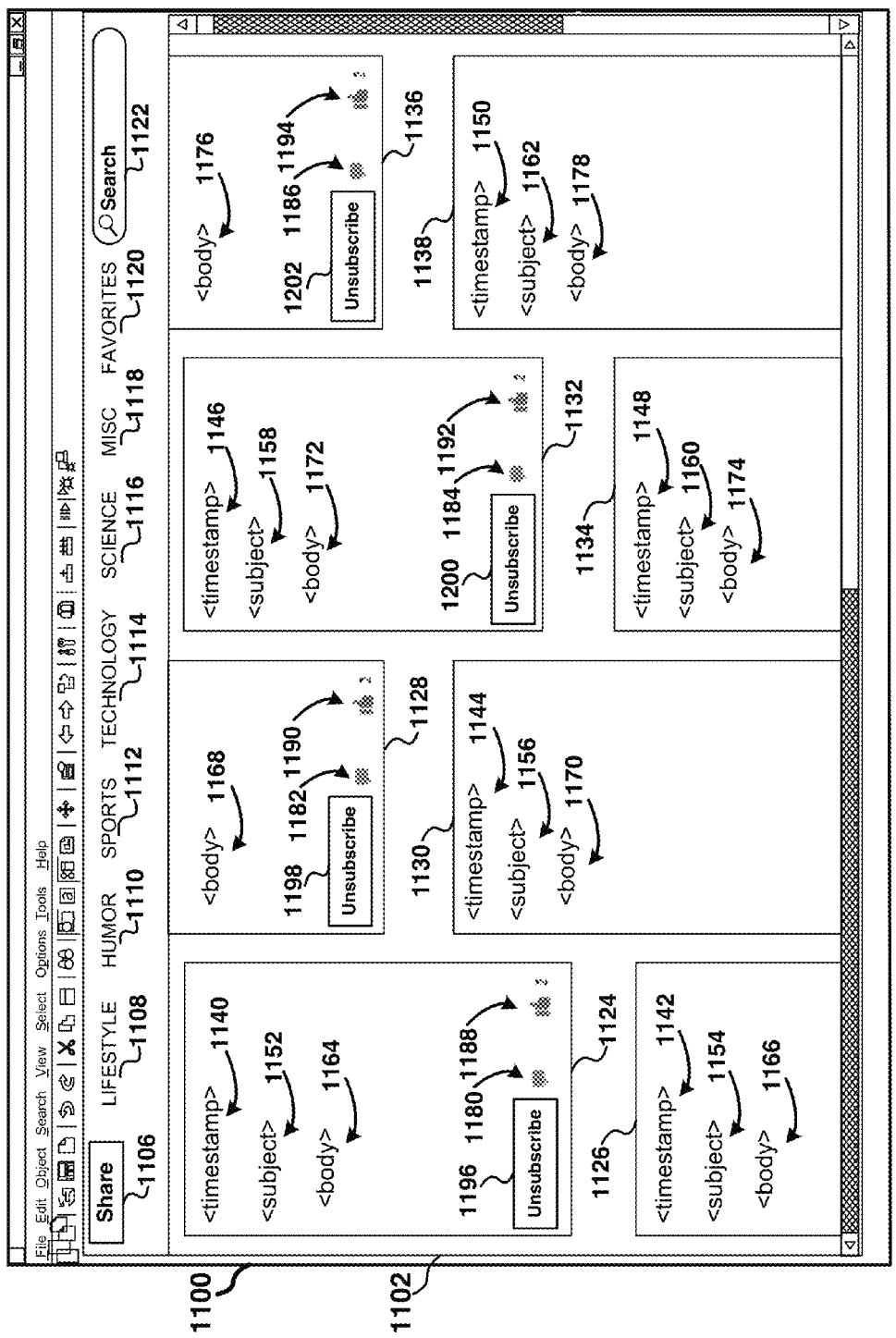
FIG. 11 illustrates an exemplary shared environment for publication of aggregated and cleaned electronic mail messages.

In some examples, the clean version may be stored in a database, or other storage as described herein, in association with the account to which it was sent (1014). In some examples, a clean version also may be published in a shared environment (i.e., shared environment 1102 in FIG. 11, or the like), including displaying at least a portion of the clean version in the shared environment, the shared environment accessible using access information associated with the account (1016). A shared environment may be a website (e.g., website 118 or the like), or other facility, to which data, information, or other content may be posted or published, as described herein. In some examples, the access information may be the access information used in registering the account. In some examples, publication of a clean version may include publishing data from the clean version on a tile on a shared environment (i.e., FIG. 11). For example, a tile on a shared environment might include, or show, a timestamp (i.e., indicating a day, date and/or time that the message was sent), an age (i.e., indicating how long ago the message was sent), a subject (i.e., the subject line of the message), a body (i.e., some or all of a body of the message), a graphic (i.e., some or all of the graphics from the message), an unsubscribe button, other buttons for executing an action associated with the message (e.g., comment, like, share, or otherwise provide feedback), or other aspects of the message. Displaying one or more messages in a prioritized (e.g., left to right, top to bottom, and the like, according to one or more criteria) and tiled format, or other web browsing interface, on a shared environment may promote readability (i.e., messages may be easier to see, read, review, skim, or otherwise be visually consumed by a user), as described below (FIG. 11). In some examples, a shared environment may include other items (e.g., hyperlinks, buttons, icons, widgets, or the like) for sorting, prioritizing, sharing, searching, or performing other acts associated with a published clean version of a message (see, e.g., FIG. 11). In some examples, a message may be tagged (i.e., in a database) as published after a clean version of the message is posted on a shared environment, such that a shared environment may be updated with new messages without re-publishing previously published messages. In other examples, the above-described process may be performed or implemented differently in steps, order, function, or other aspects, without limitation to those shown and described.

FIG. 11 illustrates an exemplary shared environment for publication of aggregated and cleaned electronic mail messages. Here, window 1100 includes shared environment 1102, share button 1106, filters 1108-1120, search field 1122, tiles 1124-1138, timestamps 1140-1150, subjects 1152-1162, message bodies 1164-1178, comment icons 1180-1186, vote icons 1188-1194, and unsubscribe buttons 1196-1202. In some examples, shared environment 1102 may be a website (e.g., website 118 or the like), including various pages associated with an account in a system for electronic mail processing and publication. In some examples, shared environment 1102 may be provide or display email data for, or associated be associated with, an account. In some examples, each account may be associated with, and accessed using, a website having a uniform resource locator (URL). For example, account information and emails received using an account associated with a domain name and a username may be accessed using a website having an URL in the format of "http://<domain name>/<username>." For example, an account for Joe Smith may be associated with a website at "http://socialmail.com/JoeSmith." In this example, Joe Smith's account may be configured to receive, process, and publish at "http://socialmail.com/JoeSmith," email messages sent to the address JoeSmith@socialmail.com. In some examples, access to a website may be secured using a password, passcode, security question, or the like. In other examples, a shared environment may be provided and accessed differently and is not limited to those shown and described.

As shown, shared environment 1102 may display, show, or otherwise publish, cleaned versions of email messages in an open tiled format, where the contents of a cleaned version of a message is displayed in a tile, for example, including image, video, or other content. For example, each of tiles 1124-1138 may represent (i.e., show, display, be associated with, or the like) a cleaned version of a message. Each tile may display a timestamp or age of a message (e.g., timestamp 1140-1150), a subject of a message (e.g., subjects 1152-1162), and a part or all of a body of a message (e.g., message bodies 1164-1178). For example, timestamp 1140 may indicate a day, date and/or time in which a message (i.e., having subject 1152 and body 1164) was sent. In another example, timestamp 1140 may indicate an age of a message (i.e., number of hours, days, months, or the like, since the message was sent). Timestamps 1142-1150 may be implemented in a similar manner as described above with respect to timestamp 1140. In some examples, subjects 1152-1162 each may display a subject line from each of the messages represented in tiles 1124-1126, 1130-1134 and 1138, respectively. In some examples, subjects 1152-1162 may display text. In other examples, subjects 1152-1162 may display a graphic (i.e., logo, image, or other graphic). In some examples, message bodies 1164-1178 may include text, one or more graphics, hyperlinks (e.g., to or provided by a content provider, as part of an advertisement by a content provider, or the like), or other material from a body of a message. For example, message body 1164 may display a body of a message associated with subject 1152 and timestamp 1140, which has been cleaned of any personally identifiable and sensitive information. In some examples, message body 1164 may display an entire body of a clean version of the message. In other examples, message body 1164 may display a part or portion of a body of a clean version of the message. In some examples, tiles 1124-1138 may be laid out on shared environment 1102 as shown, with all or substantially all email messages on shared environment 1102 displayed in an open format, showing at least a part (i.e., a key or essential part (e.g., an image, a video, a significant portion of text, or the like)) or all of the clean content of the message. In other examples, tiles may be laid out differently on a website and are not limited to those shown and described.

In some examples, each of tiles 1124-1138 also may display an unsubscribe buttons (e.g., unsubscribe buttons 1196-1202), which may link (i.e., hyperlink) to another page (e.g., in a pop-up window, in a new tab in window 1100, in the same window (i.e., window 1100), in a separate window, or the like) configured to unsubscribe from a message. As used herein, "linking," "link to," and "hyperlink" refers to pointing a web browsing application to another address (i.e., URL) and retrieving and displaying content from that location. In an example, unsubscribe button 1196 may link to a page associated with a sender or source (i.e., content provider) of a message (i.e., a clean version, in whole or in part) displayed in tile 1124 for unsubscribing to emails from that sender. In another example, an invocation (e.g., by clicking, placing a cursor over, or otherwise selecting) of unsubscribe button 1196 may automatically unsubscribe a user (i.e., an account) from receiving email messages from a sender (i.e., of the message shown in tile 1124. Unsubscribe buttons 1198-1202 each may function similarly for the respective email messages shown in tiles 1128, 1132 and 1136. In still other examples, an unsubscribe button may be implemented differently and is not limited to those shown and described.

In some examples, each of tiles 1124-1138 also may display a comment icon (e.g., comment icons 1180-1186). In some examples, a comment icon may link to another page or website (e.g., in a pop-up window, in a new tab in window 1100, in the same window (i.e., window 1100), in a separate window, or the like) displaying comments associated with a message. For example, comment icon 1180 may link to another page or another website displaying comments associated with a message (i.e., a clean version, in whole or in part) displayed in tile 1124. Likewise, comment icons 1182-1186 may, respectively, link to pages or websites displaying comments associated with messages displayed in tiles 1128, 1132 and 1136. In other examples, a comment icon may link to another page or website providing a user interface for entering comments associated with a message. In yet other examples, a comment icon may be implemented differently and is not limited to those shown and described.

In some examples, each of tiles 1124-1138 also may display other icons for providing feedback (e.g., vote icons 1188-1194). As shown, vote icons 1188-1194 may be displayed as a graphic or image (i.e., Facebook's thumb-up graphic, Twitter's bird graphic, Google's Google+ logo, or other image) with a number next to it, the number indicating a vote count associated with a message shown in the respective tile (e.g., vote icon 1188 indicates the vote count for a message shown in tile 1124 (i.e., associated with subject 1152 and body 1164), vote icon 1190 indicates a vote count for a message shown in tile 1128 (i.e., associated with body 1168), and so on). A vote count may be a number of votes representing various types of feedback (e.g., "likes" on Facebook, pluses on Google+, number of times a message (i.e., a message displayed in the same tile as the graphic or image) is forwarded, or other feedback). In some examples, a vote count may indicate or represent the number of times a message was sent to other users (i.e., other accounts). In other examples, a vote count may indicate or represent a number of times the message has been forwarded from one user to another user. In still other examples, a vote count may indicate or represent a number of times the message has been posted, recommended, liked, shared or otherwise acted upon by a user to indicate a preference, or impression of, the message. In some examples, vote icons 1188-1194 may be implemented as icons or buttons that may be selected to automatically update or increment a vote count. In other examples, vote icons 1188-1194 may be implemented as hyperlinks that may be selected to link to another page, window or website configured to provide a user interface for indicating a vote. In still other examples, a vote icon may be implemented differently and is not limited to those shown and described.

In other examples, tiles 1124-1138 may include other features and display other information associated with a message. For example, other information may be shown or displayed in each tile (e.g., a sender, a link to a related message, or the like) (not shown). In another example, graphics, buttons or icons (not shown) may be included in tiles 1124-1138 (e.g., to delete a message, to indicate a user of a social network (e.g., Facebook, Google+, Twitter, or the like) that has recommended, commented, or otherwise provided feedback regarding a message, to prioritize or re-arrange (i.e., change the order of) the message or similar messages, or the like). In still another example, graphics, buttons or icons (not shown) may be included in tiles 1124-1138, for example, to link to a website or page associated with a social network account (e.g., for a user, a user's friend, a celebrity that a user is following, or the like).

In some examples, shared environment 1102 may include share button 1106, which may be invoked (e.g., by clicking, placing a cursor over, or otherwise selected) to render and present a page configured for sharing one or more messages presented in tiles 1124-1136, or in other tiles published above or below tiles 1124-1136 (not shown). In some examples, sharing may include forwarding to another user, another email address, publishing (e.g., recommending, liking, posting, linking, or otherwise publishing) on a social network (e.g., Facebook, Twitter, Google+, or the like), for example, using access information associated with both an email account (i.e., provided by a system for electronic mail processing and publication) and a social network account. In other examples, a message published on shared environment 1102 may be shared using another hyperlink, icon or button (e.g., comment icons 1180-1186, vote icons 1188-1194, or the like) provided on the website, for example, on a tile posting a message. In still other examples, messages may be shared differently than described and shown herein.

In some examples, shared environment 1102 may display, or otherwise provide, other links, icons, and/or buttons associated with various functions, for example, linking to other pages associated with shared environment 1102. For example, shared environment may include filters 1108-1120 for filtering email messages published on shared environment 1102, for example, by subject matter. In some examples, each of filters 1108-1120 may be implemented as an icon, button, or other hyperlink, which may be invoked (e.g., by clicking, placing a cursor over, or otherwise selected) to show a subset of the messages published on shared environment 1102. For example, filter 1108 may be invoked to show only a subset of messages being associated with (e.g., categorized under, tagged as having subject matter regarding, or otherwise associated with) lifestyle in shared environment 1102. Similarly, filter 1110 may be invoked to show only a subset of messages being associated with humor in shared environment 1102. Also similarly, filters 1112-1120 may be invoked to show only a subset of messages being associated, respectively, with sports, technology, science, miscellaneous and favorites. In some examples, shared environment 1102 also may include search field 1122, which may provide a field for entering a query or term for searching, for example, data associated with messages being published on shared environment 1102. In some examples, search field 1122 may enable searching of other data associated with other messages. In still other examples, search field 1122 may be implemented differently (e.g., enable searching of a different data set, be a widget provided by a third party, or the like), and is not limited to those shown and described.

In some examples, tiles 1124-1138 may be sorted or prioritized according to various criteria. In some examples, a default criterion for prioritizing tiles 1124-1138 may be the ages of their respective messages. For example, tiles 1124-1138 may be prioritized from newest message to oldest message (i.e., timestamp 1140 indicates a more recent date and time, or a younger or lesser age (i.e., less time has passed since the message having subject 1152 and body 1164 was sent), than timestamp 1142, and so on). In other examples, tiles 1124-1138 may be prioritized according to recommendations from other users (e.g., the number of times a message is recommended or "liked" by a Facebook friend, the number of times a message has been posted or re-posted on Twitter, the number of times a message has been shared on Google+, or the like). In still other examples, tiles 1124-1138 may be prioritized according to other criteria specified by a user having access to shared environment 1102 (i.e., a user may customize the presentation or view of messages on their shared environment according to his or her preferences). For example, a page, widget or other user interface (i.e., as part of website 118) may be provided for a user to input or select preferences, including identifying or selecting one or more criteria for prioritizing email messages on their shared environment (e.g., shared environment 1102) or identifying interests (i.e., topics, subjects, hobbies, or the like) in order to receive targeted advertising or recommendations on content providers to which the user may want to subscribe. In some examples, a button or feature (not shown) may be provided on each tile for prioritizing an email or a group of emails (e.g., from a favored content provider, a school newsletter, or the like), for example to cause presentation of the email or group of emails in a high priority position (e.g., at the top of the page, in a designated or set-off section of the page, or the like) in the shared environment. In other examples, an email or message may be demoted, or otherwise designated as having lower priority, using the techniques described herein (e.g., a button, link, feature, preferences selection, or the like), for example to cause presentation of the email or message in a low priority position (e.g., lower in, or at the bottom of, the page, or the like). In still other examples, window 1100 and the above-described elements may be implemented differently in layout, design, function, structure, features, or other aspects and are not limited to the examples shown and described.

As described herein, shared environment 1102 may be configured to present information from marketing or other opt-in emails in an open format (i.e., without a need for clicking on an item or link from an email list to open a message), including graphics, images, videos, audio content, other dynamic content, or the like. As described herein, shared environment 1102 may be configured with buttons, links and other features for ease of managing email content, including a prominent unsubscribe button (e.g., unsubscribe buttons 1196-1202) and prioritization and demotion of messages for customizing presentation of message in shared environment 1102. In other examples, shared environment 1102 may include other features for managing email content. For example, shared environment 1102 may include a related content or "show me more" button (not shown) on each tile configured to provide (i.e., present) a user with similar content (e.g., advertisements, newsletters, or other content, associated with a brand, a product, a collection, a subject matter, or other category of items associated with a message presented in the tile). In another example, shared environment 1102 may include a link on a tile for purchasing an item offered by, or related to, an email message. In still other examples, the above-described elements may be implemented differently in layout, design, function, structure, features, or other aspects and are not limited to the examples shown and described.

In some examples, an application for email processing and publication on shared environment 1102 (e.g., application 200 in FIG. 2) may be configured to gather, organize, process and/or store data (i.e., "track" data) associated with user preferences and activity (i.e., actions on, or interactions with, shared environment 1102), as described above. For example, a variety of types of data associated with messages displayed on shared environment 1102, including a user's activity, may be tracked for use in targeting advertisements and other subscription emails that may be of interest to a user. Activity data may include types of (i.e., subjects, products, brands, interests, or other aspects of content in) emails subscribed to, unsubscribed from, prioritized, demoted, liked by friends, linked to, viewed many times, viewed for long periods of time, trends indicated by such activity, or other metrics. Such activity data may be processed to determine trends, patterns, or other useful information about a user (e.g., buying patterns, media (e.g., books, video, music, and the like) preferences, interests, hobbies, and the like). In some examples, targeted advertisements or subscription email suggestions (e.g., newsletters, marketing emails, or other opt-in emails that may be of interest to a user) may be determined and provided to a user based upon activity data associated with the user's account. In other examples, targeted advertisements or subscription email suggestions may be determined and provided to a user based upon activity data associated with one or more groups or a plurality of users. In some examples, activity data may be used by an application for email processing and publication on shared environment 1102 (e.g., application 200 in FIG. 2) to provide targeted advertisements or subscription email suggestions to a user. In other examples, such activity data may be shared with, or provided to, content providers for their use in targeting advertisements, marketing emails, newsletters and the like. For example, activity data indicating a user subscribes to, prioritizes, and/or has friends that like, a string instrument newsletter may cause an application for email processing and publication on shared environment 1102 (e.g., application 200 in FIG. 2) or a content provider to target an advertisement for a hand cream to the user. In still other examples, data associated with an application for email processing and publication on shared environment 1102 may be used differently and are not limited to the examples shown and described.

In some examples, shared environment 1102 may be configured for display or presentation on a mobile client or device. For example, shared environment 1102 may be displayed using a mobile application or mobile web browser installed on a mobile computing or communications device. In some examples, an application for email processing and publication on shared environments (e.g., application 200 in FIG. 2) may be configured to process content (e.g., video, audio, text, image, or other data) in a subscription email from a content provider for presentation in a shared environment on a mobile application or mobile web browser. In some examples, an application for email processing and publication on shared environments (e.g., application 200 in FIG. 2) may be configured (i.e., using HTML5 or other language or program for structuring and presenting content on a web application or browser) to detect a type of mobile computing or communications device, and to render content based on the type of mobile computing or communications device. In other examples, the above-described elements may be implemented differently in layout, design, function, structure, features, or other aspects and are not limited to the examples shown and described.

Grid View of Tiles and Content Rotation

Attention is now directed to FIG. 12A where one example of a flow diagram 1200a for generating a grid view including one or more tiles is depicted. At a stage 1201, an electronic email message (EMM) (e.g., an email, a message, a newsletter, an advertisement, an invoice, etc.) is received at a first domain. The first domain may be any unique address that may be electronically accessed, such as by way of an email address, a uniform resource identifier (URI), a uniform resource locator (URL), a uniform resource name (URN), or the like that defines an entity and/or resource by name, for example. A syntax, character string or other used for accessing the first domain may include but is not limited to HyperText Transfer Protocol (e.g., http://), HyperText Markup Language (HTML), or other formats. The EMM may itself be in a format such as HTML for example, and may include tags or other identifiers that may be used to divine the content of the EMM.

At a stage 1203 the EMM is parsed to identify content in the EMM for subsequent tiling as will be described below. Content in the EMM may include but is not limited to text, images, media, metadata, objects, links, lists, and hyperlinks to other content, for example. Media may include but is not limited to audio, video, audio/video, animation, and other media formats. The EMM may include tags that are associated with and may define or describe the content the tag is associated with. The tags may be associated with and/or recognized those typically used by browsers (e.g., Firefox™, Chrome™, IE™, Bing™ or others) that operate on HTML data. Parsing at the stage 1203 may be accomplished using a variety of software, algorithms, program code, and the like, including but not limited to Java™, parsers that are Java™ based, a custom parser, or others.

At a stage 1205 content identified by the parsing at the stage 1203 is extracted into one or more content types. The one or more content types may be those described above, but are not limited to content types described herein. For purposes of explanation, the following may be some of the content types that are extracted: text (T), image (I), media (M), and link (L). In that an image or text may also be a moving image or text, as in a movie or video, moving images and text may fall with the media content designation. Text T and image I, unless otherwise stated, may refer to still images and still text. Media M may comprise all other types of content that may be extracted, regardless of the actual type of media. For example, media M may include audio, video, animation, etc. Link L content may refer to any type of link (e.g., a hypertext link or other) regardless of form or syntax that may be recognized, acted upon, and used to designate a location or address of some item or object, such as link to a web page, web site, ftp site, etc.

At a stage 1207, some or all of the content types extracted at the stage 1205 are deconstructed into a tile format that is configured for content rotation of the one or more content types. Therefore, text T content types may be broken down into a tile format that allows for content rotation of the text (e.g., ASCII character strings from the ASCII character set or equivalents) contained in the T content type. Similarly, image I content may be broken down into a tile format that allows for content rotation of the image or images contained in the I content type. In some applications, some content types such as media M or link L may not be configured for content rotation. Furthermore, in some applications, text T and/or image I content may not be configured for content rotation. Whether or not content may be configured for content rotation may be determined, at least in part, by a tag or tags associated with the content, for example.

At a stage 1209 a tile is generated using the file format generated by the deconstructing as the stage 1203. As will be described below, a tile may be a discrete entity such as a file or other object that may be operated on and manipulated by a browser or other software program or algorithm. For example, the tile format may include syntax for HTML and the tile may be generated from the HTML in the tile format. Moreover, the tile that is generated may include HTML in its syntax and/or use HTML to describe at least some of its data. Generating the tile using the tile format may further include formatting the data in the tile for display system the tile may be viewed on (e.g., a display of a smartphone, tablet, pad, laptop/notebook computer, computer monitor, HDTV, etc).

At a stage 1211, the tile is associated with an account of a subscriber to the first domain. As one example, of the EMM was communicated (e.g., sent via email) to "Jane_Doe@first.domain.com", then the generated tile would be associated with the account of "Jane Doe" in a manner similar to that of an email account being associated with an account name and a domain the account is registered to, such as jane.doe@yahoo.com or jane_doe@gmail.com.

At a stage 1213, a grid view is generated and the tile, and optionally any other tiles that are associated with the account at the stage 1211 may be included in the grid view. As will be described below, the grid view may include a single tile or a plurality of tiles; however, the grid view may display only a portion of the plurality of tiles. For example, if there are 57 tiles in the grid view and a display system the grid view is displayed on may only display no more than 20 tiles at a time, then other tiles in the grid view may not be displayed until some action such as scrolling the display is taken to bring the unseen tiles into view.

At a stage 1215, if additional EMM's are received at the first domain, then the flow 1200a may resume at some prior stage, such as the stage 1203, for example. A plurality of other domains may be transmitting a plurality of EMM's addressed to the first domain. To that end, flow 1200a may execute as needed to process each EMM to generate tiles for grid views and content rotation for each subscriber registered or otherwise associated with the first domain. In some applications, the first domain may be regarded as an aggregating domain where EMM's from a plurality of different domains are aggregated and processed into tiles for grid viewing and content rotation for a plurality of subscriber to the aggregating domain.

Figure 12B:
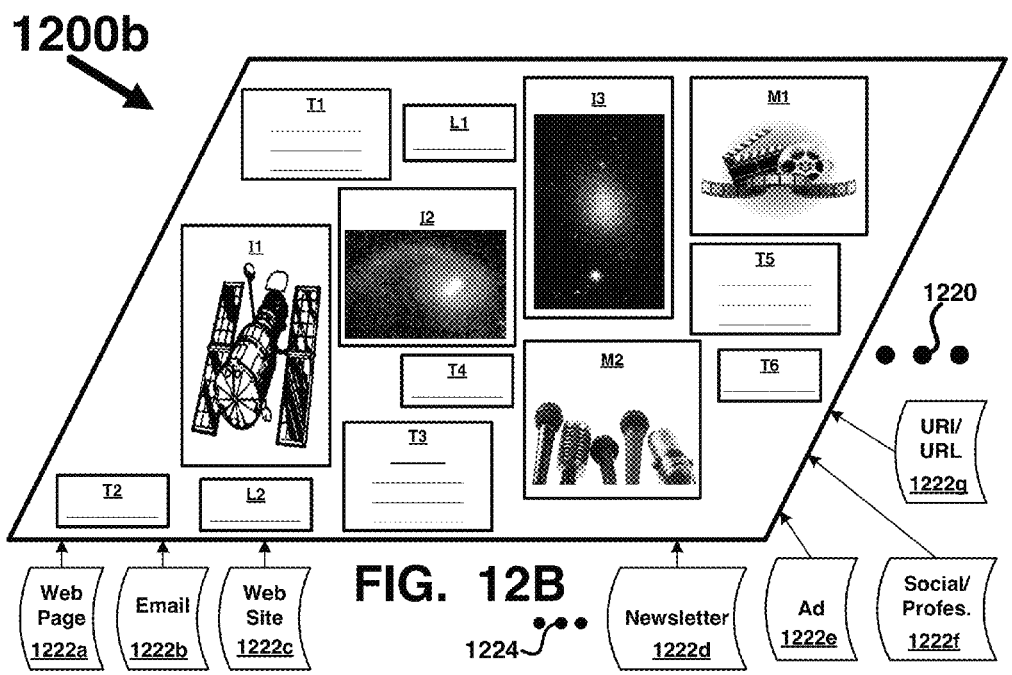
FIG. 12B depicts one example of an electronic email message having different content types.

Moving on to FIG. 12B, one example of an electronic email message 1200b having different content types is depicted. Here, electronic email message 1200b may be in a variety of forms and/or file formats, such as a page or the like, for example. In the example depicted, EMM 1200b includes a plurality of different content types which are presented for the purposes of explanation only are not to be construed as limiting examples. Other content types not depicted in FIG. 12B may be included, without limitation, into EMM 1200b. Moreover, EMM 1200b may include more or fewer content and/or content types than depicted in FIG. 12B. Content types in EMM 1200b may include but is not limited to: one or more text types denoted as T1-T6; one or more image types denoted as I1-I3; one or more media types denoted as M1-M2; and one or more link types denoted as L1-L2. EMM 1200b may derive from a variety of sources and/or domains including but not limited to those denoted as 1222a-1222g. There may be more or few sources for EMM 1200b as denoted by 1224.

As one example, a subscriber may subscribe to an email newsletter about the Hubble Space Telescope and denoted as newsletter 1222d. Each issue of the newsletter is emailed as EMM 1200b to the address of the subscriber at the first domain (e.g., the aggregating domain). The flow 1200a may be applied to the EMM 1220b to generate at least one tile.

As one example, tags in EMM 1220b may identify the various content types as described above and may also be used to define associations or linkages between the same or different content types within EMM 1200b. Therefore, image I1 may be associated with text T1 and T2 and with link L2. T1 may be one or more paragraphs, sentences, or the like that are germane to the image I1 of the Hubble Space Telescope (e.g., describing the capabilities of the telescope), and T2 may be one or more paragraphs, sentences, or the like that describe where more information may be found by clicking or otherwise activating link L1 (e.g., a one or more hypertext links). Image I1 may be a single image that may be static, or I1 may be a series of images (e.g., as in an image gallery). The one or more paragraphs, sentences, or the like for T1 and T2 may be too long to view in the space allocated to them during the tiling process or to fit on the screen allocated in the grid view as will be described above. To that end, the tiling process at the stages 1207 and/or 1209 may configure T1, T2, and I1 for content rotation such that positioning a cursor (e.g., hovering or flying over) or other user interface (UI) construct over a selected tile and/or over text or image in the selected tile cause the content comprising the text or image to rotate. Content rotation may comprise scrolling or rolling the text of T1 and/or T2 (e.g., as is done with movie credits) or stepping through, playing back, or cycling through the images in I1 in some order or sequence, for example. Image I1 may include ten images of the telescope and content rotation may comprise displaying each of the ten images in a sequence that is timed (e.g., 2 seconds per image) or stepping through each of the ten images by some action of the UI (e.g., moving a cursor up or down while it is positioned over the image). Similarly, the text in T1 may be ten paragraphs long and content rotation may comprise displaying at least a portion of each paragraph in some sequence, timed or otherwise. If text T1 and image I1 are linked, that is they are somehow related by content, editorial, etc., then during content rotation, then paragraph 1-of-10 of I1 that is associated with image 1-of-10 of T1 will rotate whilst that image is being displayed in the selected tile, followed by subsequent paragraphs undergoing content rotation when their associated image is rotated into view within the selected tile.

Content types, without limitation, may be associated with one or more other content types and content rotation among associated content types may be application specific and/or determined by tags or other data included in the EMM from which they were derived. Media content types may vary as widely as numerous varieties of media that may be included in an EMM. Media M1 may be a movie that when activated (e.g., by hovering) may intimate content rotation and/or some other action. Content rotation of M1 may merely comprise commencing playback of the underlying movie content within the selected tile. text T5 may be subtitles that are associated with M1 and content rotation may comprise a synchronized scrolling of text T5 as M1 is played back. In that M1 may comprise a movie, TV show, video, or the like, during content rotation any sound, audio, or sound track for M1 may also be played back (e.g., over a speaker system or headphones, etc.). Media M2 may comprise music and T6 may comprise lyrics or a score of the music and may content rotate in association with content rotation of M2. Link L2 may comprise one or more links (e.g., hyperlinks) associated with image I2 and may content rotate through the one or more links while is I2 active. The foregoing are non-limiting examples of what may be done with content types in a tile and actual implementations will be application specific and may be programmed or otherwise coded to control behavior of content types in a tile.

Figure 12C:
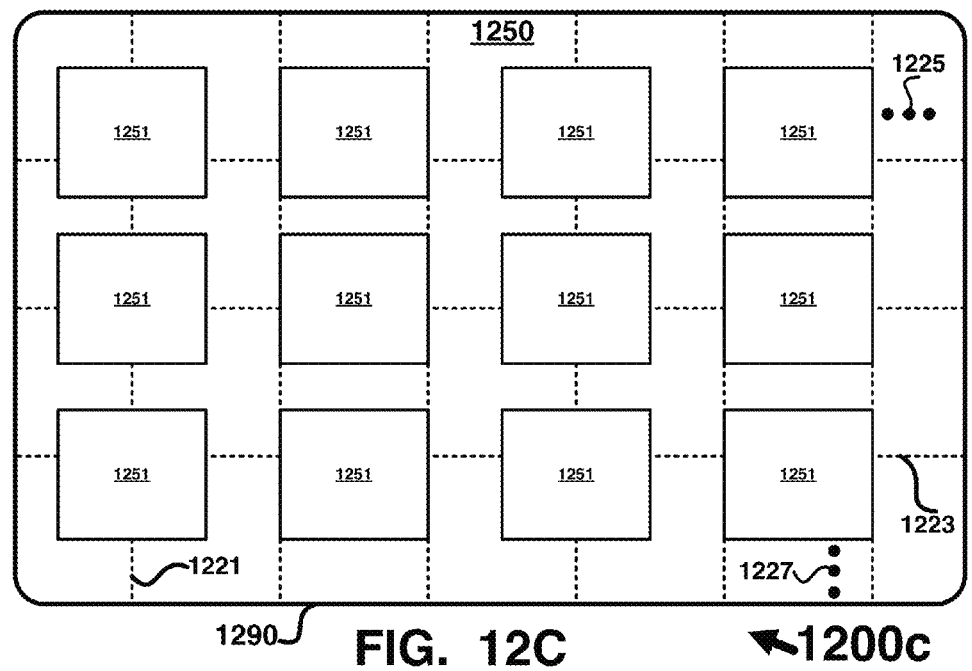
FIG. 12C depicts one example of a grid view including a plurality of tiles displayed on a display system.

Referring now to FIG. 12C where one example 1200c of a grid view 1250 including a plurality of tiles 1251 displayed on a display system 1290 are depicted. Here, dashed horizontal 1223 and vertical 1221 grid lines are depicted to illustrate that the grid view 1250 may include an orderly arrangement of tiles 1251 that may have the same size; however, the grid view 1250 may include an arrangement of tiles 1251 that is not orderly and the tiles 1251 need not be the same size or shape and may have other than rectangular or square shapes. Grid view 1250 may include more or fewer tiles as denoted by 1223 and 1225. If the grid view contains more tiles 1251 than may be displayed by display system 1290, then horizontal and/or vertical scroll bars or the like may be used to bring other tiles into view on the display system 1290 as will be described below. Typically, each tile 1251 may comprise content from different EMM's that have been processed, such as by flow 1200a of FIG. 12A.

Figure 12D:
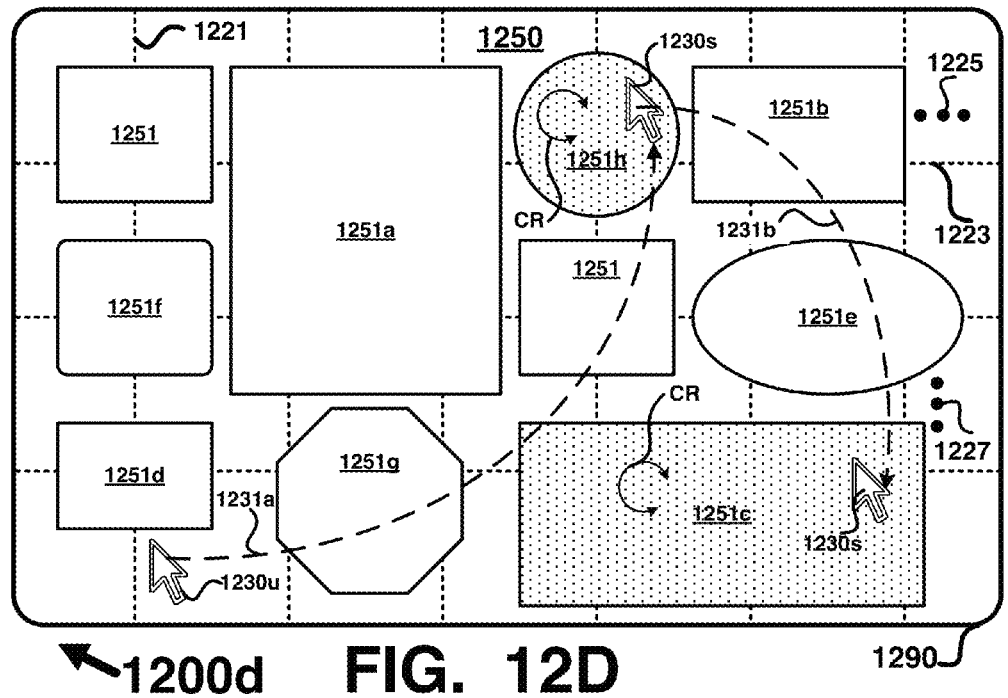
FIG. 12D depicts one example of different configurations for tiles in a grid view and flying or hovering over a tile to initiate content rotation of content in the tile.

Turning now to FIG. 12D where one example of different configurations for tiles 1251 in the grid view 1250 and flying or hovering over a tile 1251 to initiate content rotation CR of content in the tile 1251 are depicted. In FIG. 12D, tiles 1251-1251h in grid view 1250 may have different shapes and sizes and need not be arranged in an orderly manner as compared to the tiles 1251 depicted in FIG. 12C. A cursor 1230 is depicted as being a non-limiting example of a user interface (UI) that may be used to select or activate a tile 1251 in the grid view 1250. When cursor 1230 is not touching and/or positioned over a tile 1251 the cursor is denoted as 1230u; conversely, when the cursor 1230 is and/or positioned over a tile 1251 the cursor is denoted as 1230s. A device such a mouse, track pad, or other at behest of a user may cause cursor 1230u to move 1231a from its present location and fly or hover over circular tile 1251h thereby causing that tile to be selected or activated for content rotation CR where the cursor activating a tile is denoted as 1230s because it is present selecting tile 1251h. Content rotation CR or one or more content types displayed within tile 1251h is now enabled and may continue so long as cursor 1230s remains in a position to select that tile (e.g., continues to hover over tile 1251h). Subsequently, the cursor 1230s moves 1231b from circular tile 1251h to rectangular tile 1251c. Content rotation CR is halted in circular tile 1251h because that tile is no longer selected or activated, and content rotation CR is initiated in rectangular tile 1251c because that tile is currently selected by cursor 1230s. Moving the cursor 1230 away from any selected tile may cause content rotation CR to terminate in that tile. When the cursor 1230 is not positioned and/or touching any of the tiles in grid view 1250 (e.g., as in cursor 1230u) then all tiles in the grid view 1250 may be disabled for content rotation CR.

Figure 12E:
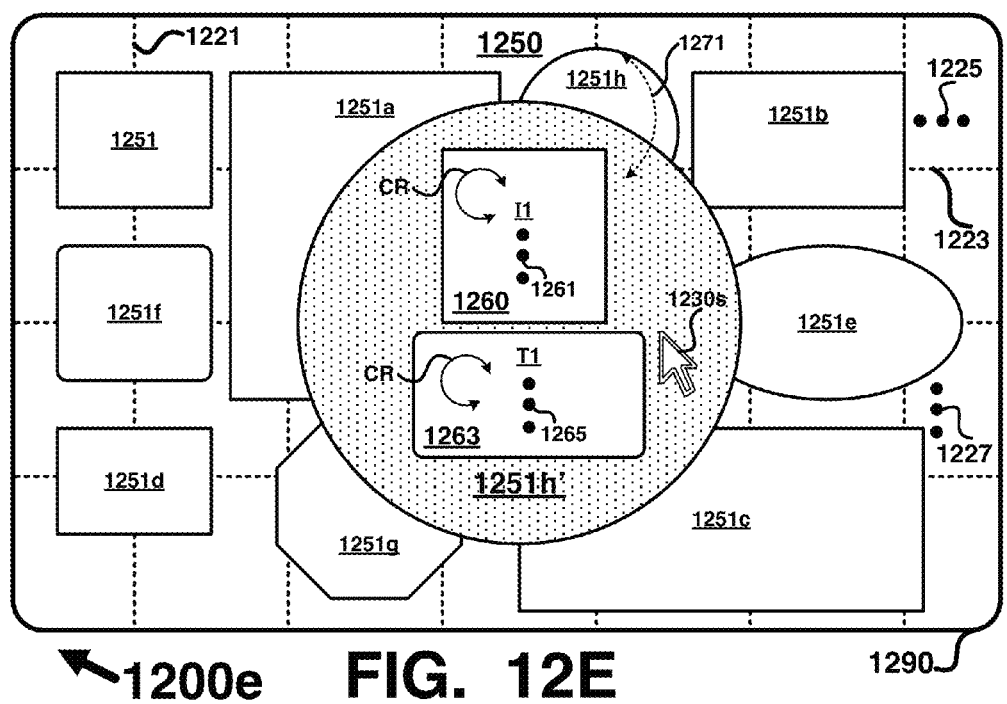
FIG. 12E depicts one example of a selected tile made visually more prominent than un-selected tiles in a grid view.

Description now turns to FIG. 12E where one example of a selected tile 1251h' is made visually more prominent than un-selected tiles in grid view 1250. Here, selected tile 1251h transitions 1271 (e.g., zooms) from its initial size to a larger size denoted as tile 1251' in the grid view 1250 and remains at the larger size so long as it is selected by cursor 1230s. Relative to the other un-selected tiles in grid view 1250, selected tile 1251' is more visually prominent in the grid view and dominates a larger portion of the viewing area of display system 1290 than the un-selected tiles.

While the cursor 1230s continues to hover or otherwise select tile 1251', content such as image I1, text T1 or both may have content rotation CR initiated in any temporal sequence, such as at the same time or a different times, for example. A rate at which content is rotated may be the same or deferment for content types in a selected tile. Tile 1251h' may transition 1271 back to its un-selected size in the grid view 1250 when the cursor 1230s is removed and/or ceases to hover over the tile such that tile 1251h' morphs from its selected an prominent display in the grid 1250 back to its un-selected view in the grid as tile 1251h. A similar to-from transition may occur for the other tiles in grid view 1250, with each tile transitioning to a prominent view when selected and morphing back to its normal non-prominent view upon becoming un-selected. Un-selected tiles may be configured to have a muted or visually diminished appearance relative to a selected tile or selected tiles in the same grid view 1250 which may be configured to have a more striking or visually dominant appearance. Although a single selected tile has been descried with regard to the grid view 1250, the present application is not limited to only one tile being active at the same time, and in some applications, actions by the UI (e.g., a CTRL sequence on a keyboard or the like) may cause a plurality of tiles 1251 to be selected or otherwise activated at the same time in the same grid view 1250 and content type in each of the plurality of selected tiles 1251 may have content rotation CR.

Figure 12F:
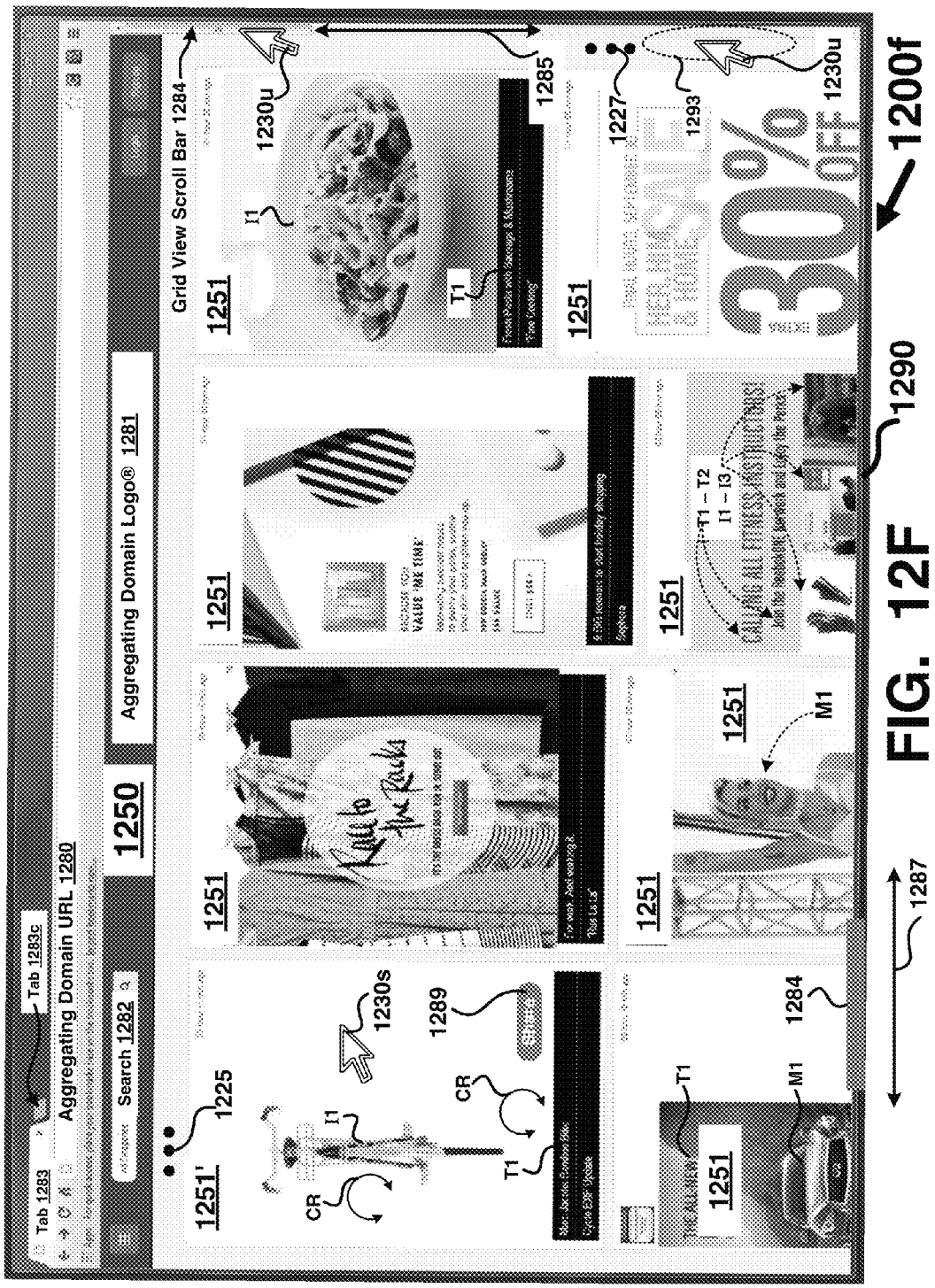
FIG. 12F depicts a grid view of plurality of tiles and their respective content types with one of the tiles being selected and having content rotation of its content.

Turning now to FIG. 12F where a grid view 1250 of plurality of tiles 1251 and their respective content types with one of the tiles 1251' being selected and having content rotation CR of its content. Here, grid view 1250 may appear as a tab 1283 or the like in a web browser (e.g., Chrome, Fire Fox, BING, IE, or other) presented on display system 1290 (e.g., a touch screen, laptop display, desktop PC display, smartphone display, tablet/pad display, LCD, OLED, HDTV, projection display, virtual image display, HUD, Plasma Display, 3D Display, or other). Other grid views 1250 (not shown) may be presented in other tabs such as tab 1283c, for example. In tab 1283, some of the tiles 1251 in grid view 1250 may be on screen (as shown) and other tiles in the grid view may be off screen (not shown) but may be brought into view or out of view by moving (1285, 1287) a scroll bar 1284, via cursor 1230u or other UI methods, for example. In some examples, a finger or stylus on a touch screen device may comprise the UI. In other example, a keyboard, track pad, arrow keys, mouse or similar tracking device may comprise the UI. In yet other examples, a gesture recognition system that tracks a user's body movements and/or gestures (e.g., the eyes, facial features, hands, etc.) may comprise the UI. The actual UI that interacts with the grid view 1250 and it tiles 1251 will be application dependent and is not limited by the examples described herein.

In FIG. 12F, a subscriber to the aggregating domain upon logging in (e.g., user name & password) into the domain may enter an address (e.g., URL 1280) where tiles 1251 associated with the subscribers subscribed to EMM's are populated with the various content types as described above. The processed EMM's presented in the tile 1251 format may reflect the subscribers interest in food, fashion, automobiles, bicycling, fitness, bargain hunting, and a variety of other interests. As one example, a received EMM relating to a bespoke bicycle shop in another state is subscribed to by the subscriber, is processed after being received, and generated into tile 1251, which becomes selected tile 1251 when activated by cursor 1230s. Content rotation CR of text T1 textually describes in several paragraphs, custom bicycle features being visually displayed in regard to content rotation CR of image I1 which comprises several images for each of the custom features. Paragraph one may describe features in image one, and so forth. In some examples, the subscriber may have other persons or entities that he/she may wish to share some or all of the content in a tile 1251. To that end, a tile 1251 may include an icon or other field or image that when activated (e.g., via the cursor 1230s or other) may allow the tile's content to be shared (e.g., as another EMM to another domain). For example, activating a "Share" icon 1289 in selected tile 1251' may cause content in that tile to be emailed or otherwise transmitted to an address such as an email address, URI, URN, URL, or other. In some examples, activating the "Share" icon 1289 results in content in the selected tile 1251' being shared only with another subscriber to the aggregating domain 1280. That is Jane_Doe@aggregating.domain.com may share tile 1251' with one or more subscribers such as subscriber John.Doe@aggregating.domain.com, for example. Although not depicted in FIG. 12F, selected tile 1251' or any other selected tile(s) in grid view 1250 may be displayed with prominent view as described in regards to tile 1251h' in FIG. 12E. In grid view 1250, moving the cursor 1230u to neutral region of the display system 1290 as denoted by dashed lines 1293 may operate to deactivate (e.g., render as un-selected) all tiles 1251 and prevent content rotation CR in the un-selected tiles 1251. A logo 1281 or other identifier of the goods and/or services of the aggregating domain may be displayed in the grid view 1250. Tiles 1251 in the grid view 1250 may be searched using a search tool 1282 or the like, by entering a search string in the search tool 1282, for example.

Carousel View of Tiles and Content Rotation

Figure 13B:
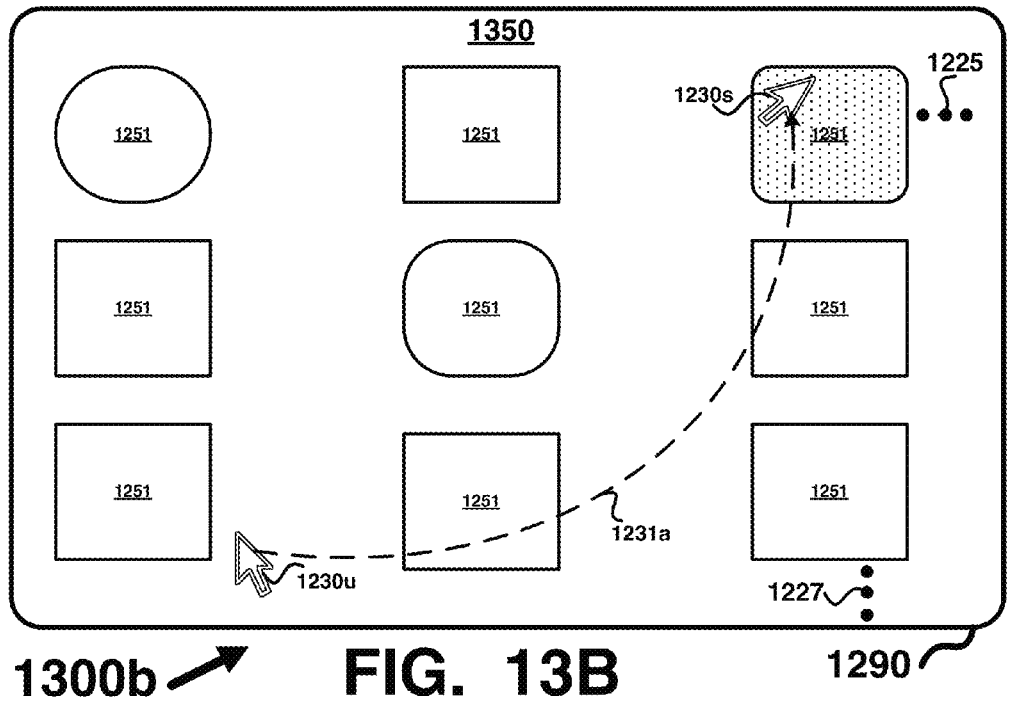
FIG. 13B depicts one example of a carousel view including a plurality of tiles displayed on a display system.

Attention is now directed to FIG. 13A where one example of a flow diagram 1300a for generating a carousel view including one or more tiles is depicted. To simplify explanation, stages 1301-1311 and 1315 may be identical or similar to the stages 1201-1211 and 1215 as described above in reference to flow 1200a in FIG. 12A; therefore, a stage 1313 where a carousel view 1350 that is different than the grid view 1250 will be discussed in conjunction with FIGS. 13B-13C. At the stage 1313 the carousel view 1350 is generated for a tile 1251 for display on the display system 1290. Here, the tiles 1251 that are generated for the carousel view 1350 may be identical to those generated for the grid view 1250; however, the manner in which the tiles 1251 are visually presented in the carousel view 1350 differs from that of the grid view 1250.

Figure 13C:
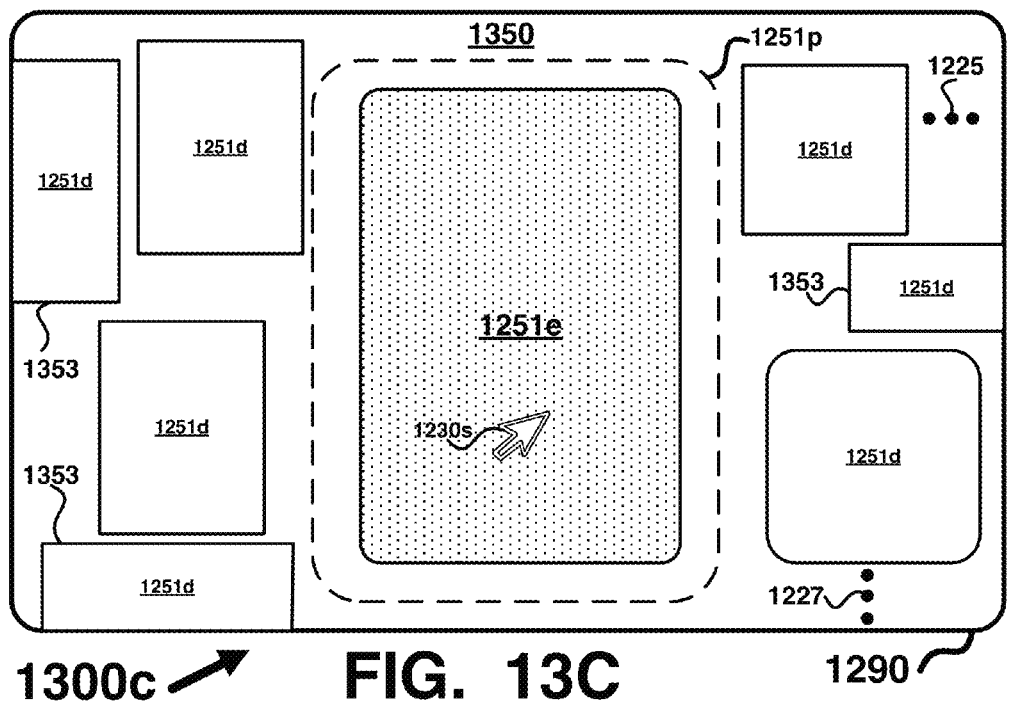
FIG. 13C depicts one example of different configurations for tiles in a carousel view and flying or hovering over a selected tile to make the selected tile visually prominent and to position un-selected tiles around a perimeter of the selected tile.

Moving now to FIGS. 13B-13C, where FIG. 13B depicts one example of a carousel view 1350 including a plurality of tiles 1251 displayed on a display system 1290. Here, moving 1231a cursor 1230u from an un-selecting position on display system 1290 to a selected position 1230s on tile 1251 is operative to activate/select tile 1251 for content rotation CR in the carousel view depicted in FIG. 13C, where one example of different configurations for tiles 1251 in the carousel view 1350 and flying or hovering over selected tile 1251e to make selected tile 1251e visually prominent and to position un-selected tiles 1251d around a perimeter 1251p of the selected tile 1251e is depicted. As selected in the carousel view 1350, tile 1251e may be moved to a centralized location on display system 1290 and may have its dimensions and/or shaped change to make it visually more dominant (e.g., takes up more of the display) than un-selected tiles 1251d which may not change in size or shape and/or may be made smaller in dimension to emphasize their diminished visual importance relative to selected tile 1251e, for example. A portion of some un-selected tiles 1251d may be partially on screen and off-screen as denoted by 1351 and as before may be moved into and out of view using scroll bars or the like. Selected tile 1251e need not be centrally positioned on display system 1290 as depicted in FIG. 13C and may be positioned anywhere on the display system 1290.

Figure 13D:
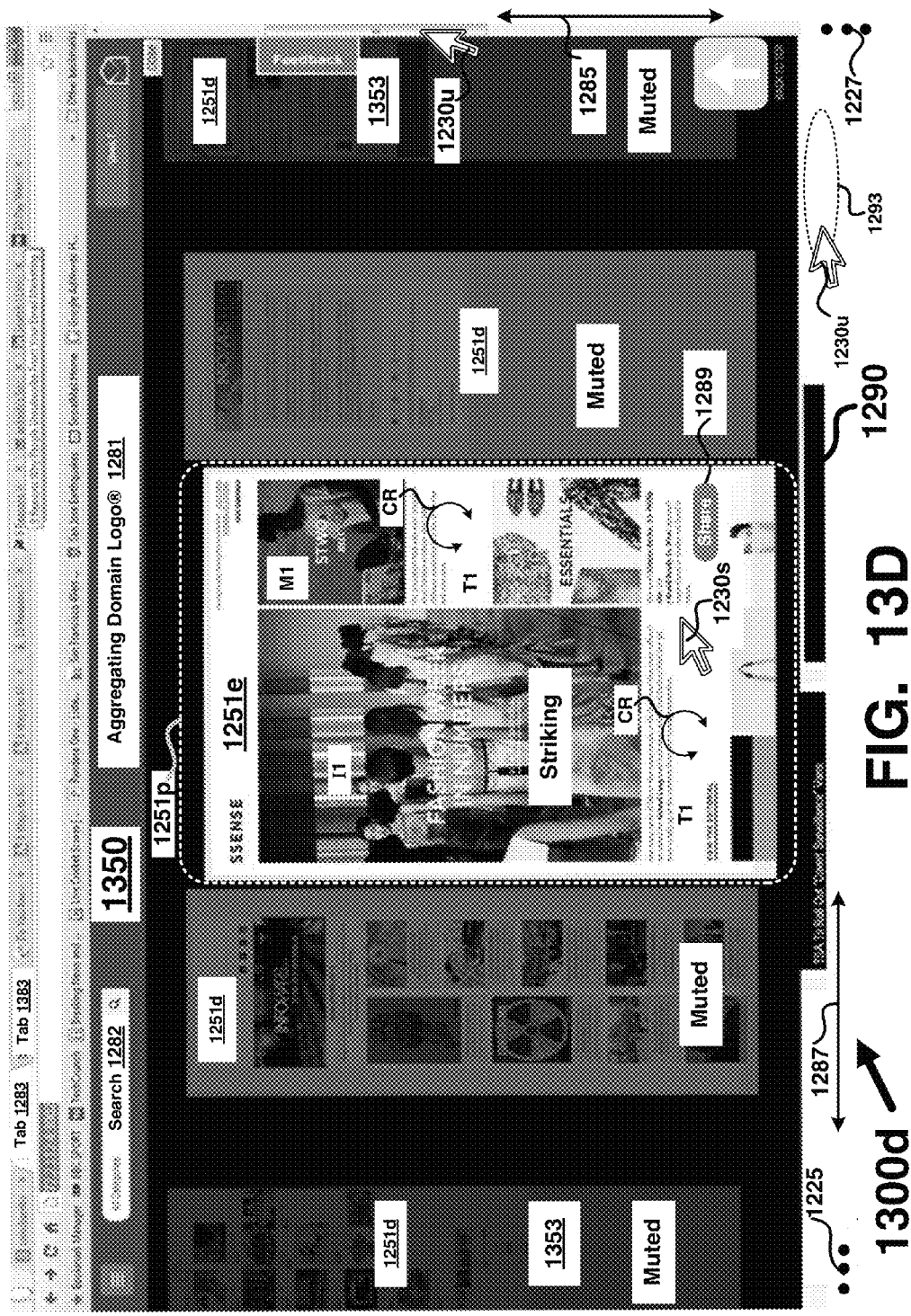
FIG. 13D depicts a carousel view of plurality of tiles and their respective content types and a selected tile being visually prominent and having content rotation of its content.

Reference is now made to FIG. 13D where carousel view 1350 of plurality of tiles (1251d and 1251e) and their respective content types and selected tile 1251e being visually prominent and having content rotation CR of its content are depicted. Here, un-selected tiles 1251d may be visually less distinct in size, color, brightness, clarity of text and/or imagery, which for purposes of description will be generally denoted as "Muted" in appearance relative to visually more striking and prominent selected tile 1251e. Un-selected tiles 1251d positioned about perimeter 1251p are "Muted" and the selected tile 1251e is visually "Striking" and its content may undergo content rotation CR. A logo 1281 or other identifier of the goods and/or services of the aggregating domain may be displayed in the carousel view 1350. Tiles 1251 in the grid view 1350 may be searched using a search tool 1282 or the like, by entering a search string in the search tool 1282, for example.

Reducing Unsubscribed Requests at Subscribed to Domains

Figure 14A:
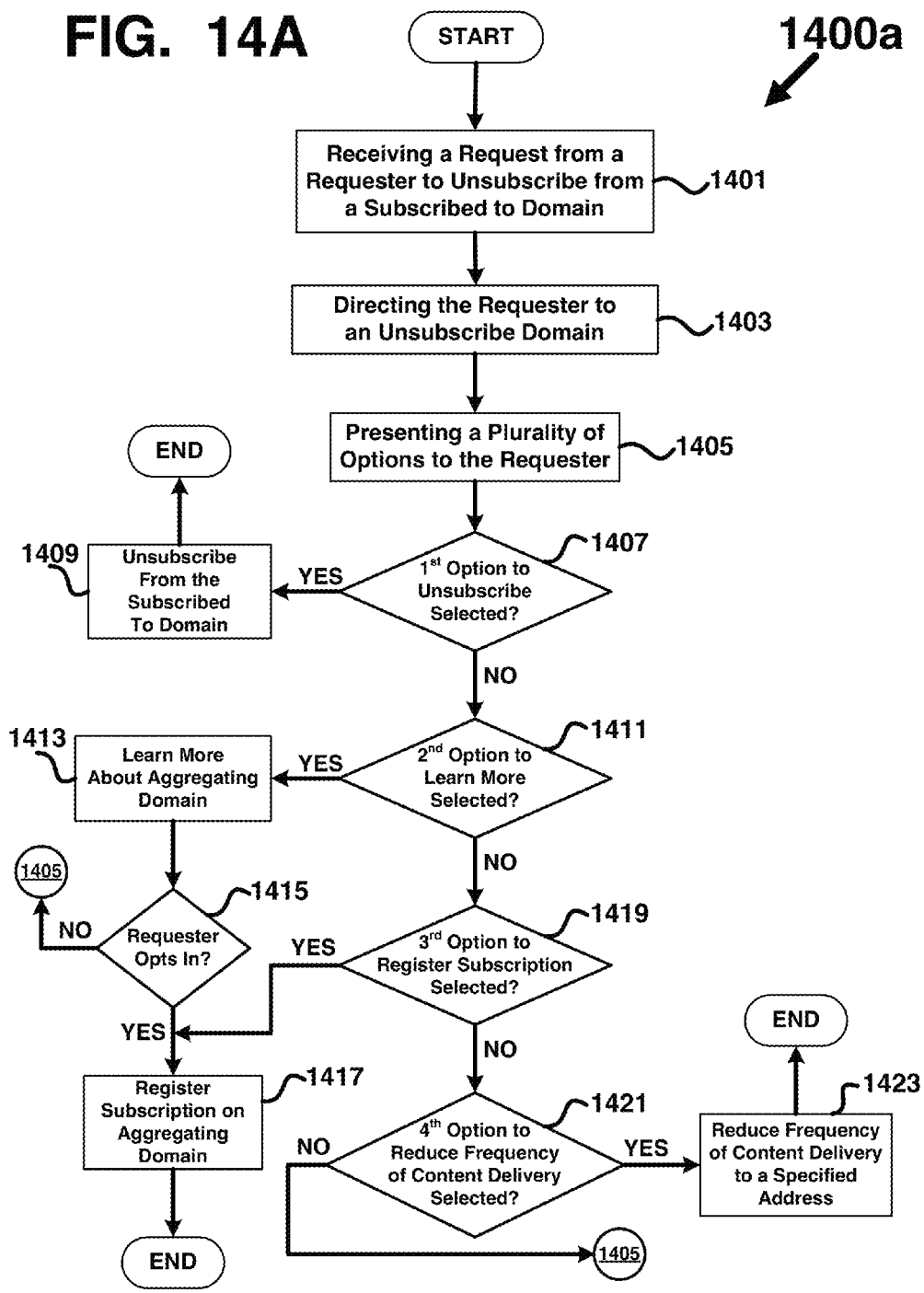
FIG. 14A depicts one example of a flow diagram for reducing unsubscribe requests.

Attention is now directed to FIG. 14A where one example of a flow diagram 1400a for reducing unsubscribe requests includes at a stage 1401, receiving a request from a requester (e.g., a user and/or subscriber) to "Unsubscribe" from a subscribed to domain. An example of a subscribed to domain may include but is not limited to an email subscription to a newsletter, an email relationship with online retailer, an email relationship with a business, an email relationship with a social network, an email relationship with a professional network, just to name a few. In many instances, a subscriber may have at some point solicited the emails by agreeing to receive them at a domain provided by the subscriber, such as Jane.Doe@mymail.com or some other email address, for example. As one example, emails from the subscribed to domain may include a statement such as: "You are receiving this e-mail because our records indicate you requested that we send information Jane.Doe@mymail.com regarding special offers, newsletters, product information and updates from Socks&Shoes.com." However, due to receiving too many emails in general from a variety of sources and/or too many emails from the subscribed to domain, the subscriber makes a decision to unsubscribe and requests to unsubscribed by taking an action such as clicking on: "This e-mail is a Socks&Shoes.com advertisement. If you no longer wish to receive our marketing e-mails, unsubscribe here. If you have difficulty with the unsubscribe link, you may also send an e-mail to PrivacyManager@socks&shoes.com. For more information, read our Privacy Policy or call 1-888-777-7777." At the stage 1401 the requester (e.g., the subscriber) may have clicked on the "unsubscribe here" hyperlink to effectuate the unsubscribe request. At a stage 1403, the requester may be redirected to an unsubscribe domain that may not necessarily be associated with the subscribed to domain. In some applications, the unsubscribe domain may be a third party domain acting as an agent for the subscribed to domain and operative to carry out the unsubscribe request, or offer additional options to the requester. At a stage 1405 a plurality of options (e.g., in addition to an unsubscribe option) are presented to the requester.

At a stage 1407 a first option to unsubscribe may be presented for selection by the requester. If a YES branch is taken, then the requester has made the decision to unsubscribe from the subscribed to domain and flow 1400a transitions to a stage 1409 where the requesters desire to unsubscribe from the subscribed to domain is executed, thereby removing the requesters email address or the like from future emails or EMM's from the subscribed to domain. Flow 1400a may terminate after execution of the stage 1409.

If a NO branch is taken from the stage 1407, then a second option to learn more may be presented for selection by the requester at a stage 1411. If a YES branch is taken from the stage 1411, then the requester has selected to learn more about an aggregating domain and flow 1400a transitions to a stage 1413. At the stage 1413 the requester is presented with information regarding an aggregating domain where instead of terminating the receiving emails from the subscribed to domain, those emails, and optionally other EMM's from other domains that are received by the requester, may be sent to an address (e.g., a unique address such as Jane.Doe@agreegating.domain.com) for the requester at the aggregating domain. At a stage 1415 the requester may decide whether or not to "Opt In" to the aggregating domain. If a YES branch is taken at the stage 1415, then the flow 1400a continues to a stage 1417 where a subscription to the aggregating domain is registered for the requester. The flow 1400a may terminate after execution of the stage 1417. If the NO branch is taken from the stage 1411, then the flow 1400a may return to a prior stage in the flow, such as the stage 1405, for example.

Returning to the stage 1411, if the NO branch is taken from the stage 1411, the flow 1400a may transition to a stage 1419 where a third option to register a subscription with the aggregating domain may be presented for selection by the requester. If the YES branch is taken from the stage 1419, then the flow 1400a may transition to the stage 1417 as described above. If the NO branch is taken from the stage 1419, then the flow 1400a may transition to a stage 1421. At the stage 1421 a fourth option to reduce a frequency at which content (e.g., EMM's) is delivered from the subscribed to domain may be presented to the requester. If a YES branch is selected at the stage 1421, then flow 1400a may transition to a stage 1423 where frequency of content delivery to a specified address (e.g., an address on the aggregating domain) is reduced. If a NO branch is take from stage 1421, then flow 1400a may return to a prior stage in the flow, such as the stage 1405, for example.

Figure 14B:
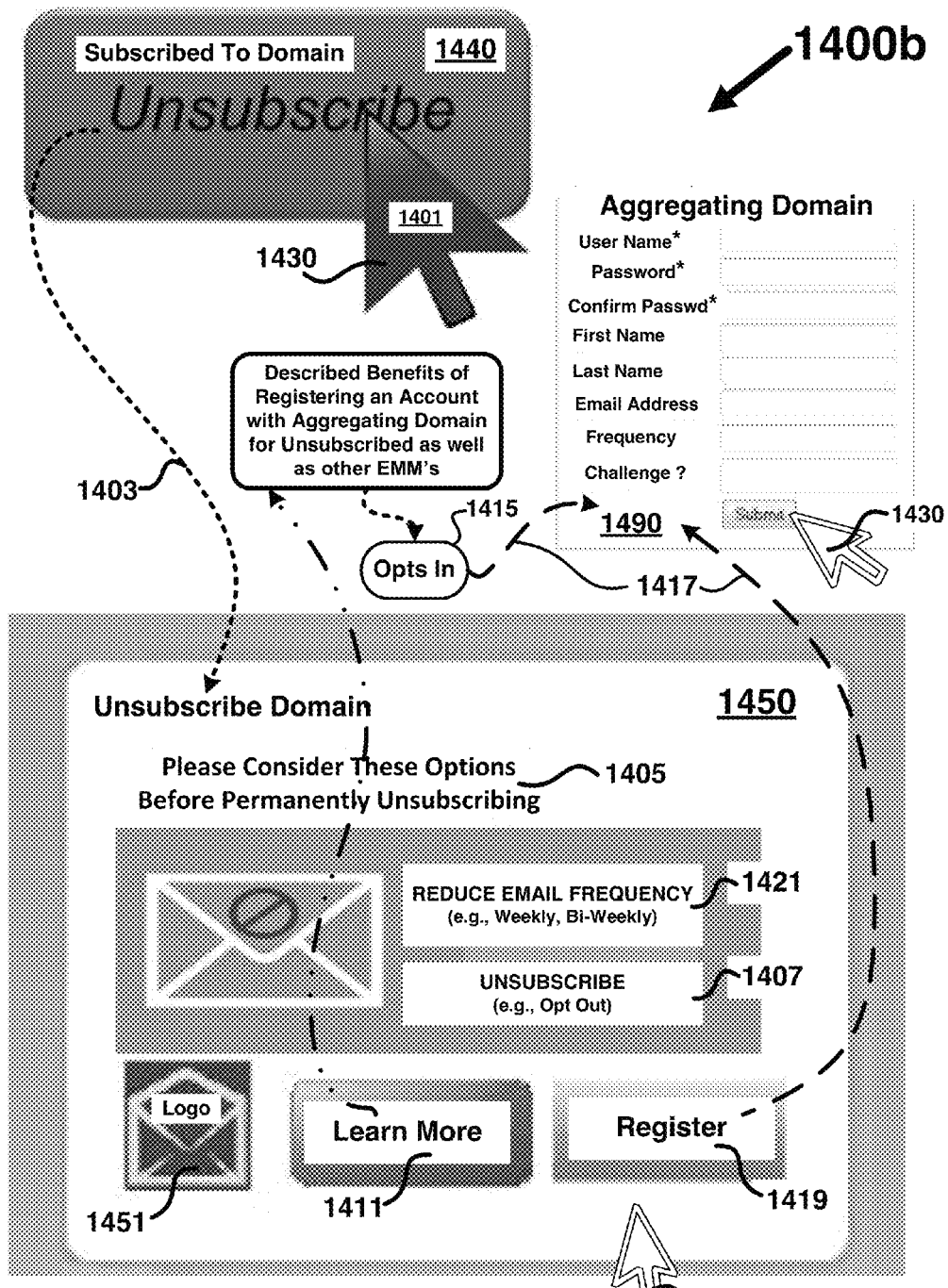
FIG. 14B depicts one example of a scenario for handling an unsubscribe request that may result in registration with an aggregating domain.

Turning now to FIG. 14B where one example of a scenario for handling an unsubscribe request that may result in registration with an aggregating domain is depicted. Here, a requester may request (e.g., at the stage 1401) to unsubscribe from a subscribed to domain 1440 by using a cursor 1430 or other UI to click on or otherwise activate an unsubscribe request contained in an EMM (e.g., an email from the subscribed to domain) or on a web site/page for the subscribed to domain. The request 1401 triggers a redirection (e.g., at the stage 1403) to an unsubscribe domain 1450 which may be a domain including but not limited to the same domain as the subscribed to domain, a third-party domain, or the aggregating domain, for example. The unsubscribe domain 1450 offers the requester a plurality of options as described above in regard to flow 1400a, including but not limited to unsubscribing from any future EMM's from the subscribed to domain 1440 by selecting 1421 using cursor 1430, learning more about the aggregating domain 1490 by selecting 1411 using cursor 1430, registering with the aggregating domain 1490 by selecting 1419 using cursor 1430, and reducing email frequency by selecting 1421 using cursor 1430.

The learning more at the stage 1411 and/or the registering at the stage 1419 may result in an actual registration 1417 of the requester with the aggregating domain 1490. Registration 1417 may include but is not limited to information such as the requester filling out information necessary to establish an account with the aggregating domain 1490, such as first name, last name, user name, password, an email address at the aggregating domain 1490, a frequency of email delivery if the option 1421 was also selected, and a security question such as a challenge question (e.g., What city were you born in?), for example. For example, Jan Doe may select jane_doe@aggregating.domain.com as her email address for future emails from the subscribed to domain 1440 to be sent to, and if option 1421 was selected, then the subscribed to domain 1440 would send emails to the aggregating domain 1490 address jane_doe@aggregating.domain.com at a frequency of once a week, for example.

Figure 15A:
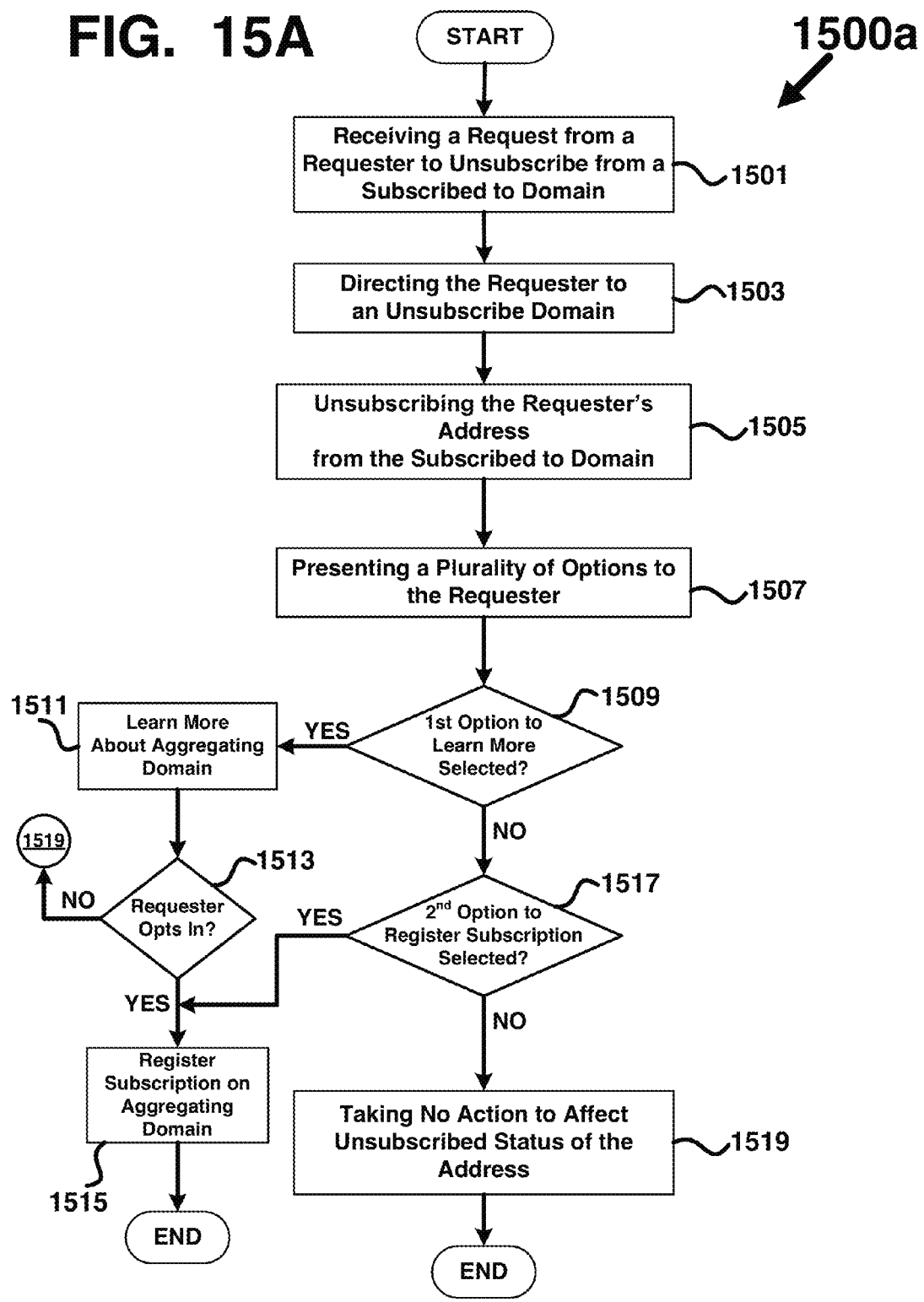
FIG. 15A depicts another example of a flow diagram for reducing unsubscribe requests.

Turning now to FIG. 15A where another example of a flow diagram 1500a for reducing unsubscribes is depicted. In contrast to flow 1400a of FIG. 14A, flow 1500a includes at a stage 1501, receiving a request 1501 form a requester to unsubscribe from a subscribed to domain. At a stage 1503 the requester is redirected to an unsubscribe domain. At a stage 1505, the requester address (e.g., email address, EMM address) is unsubscribed from the subscribed to domain, and the requester may receive a message such as "You Have Been Unsubscribed" (e.g., see 1525 in FIG. 15B). At a stage 1507, after the requester's address has already been unsubscribed from the subscribed to domain, a plurality of options may be presented to the requester.

At a stage 1509 a $1^{st}$ option to learn more is presented to the requester. If a YES branch is taken, then the requester has selected to learn more about an aggregating domain and flow 1500a transitions to a stage 1511. At the stage 1511 the requester is presented with information regarding an aggregating domain where instead of terminating the receiving of emails from the subscribed to domain, those emails, and optionally other EMM's from other domains that are received by the requester, may be sent to an address (e.g., a unique address such as John_Doe@agreegating.domain.com) for the requester at the aggregating domain.

At a stage 1513 the requester may decide whether or not to "Opt In" to the aggregating domain. If a YES branch is taken at the stage 1513, then the flow 1500a continues to a stage 1515 where a subscription to the aggregating domain is registered for the requester. The flow 1500a may terminate after execution of the stage 1515. If the NO branch is taken from the stage 1513, then the flow 1500a may return to another stage in the flow 1500a, such as a stage 1519 where no further action may be taken in regard to unsubscribing the requester's address at the stage 1501, that is, the requesters address remains unsubscribed from the subscribed to domain.

If the NO branch is taken from the stage 1509, then flow 1500a transitions to a stage 1517 where a second option to register a subscription is selected by the requester and the flow 1500a continues to the stage 1515 where the subscription is registered on the aggregating domain as was described above. The flow 1500a may terminate after execution of the stage 1515. If the NO branch is taken from the stage 1517, then the flow 1500a may transition to the stage 1519 as described above.

Figure 15B:
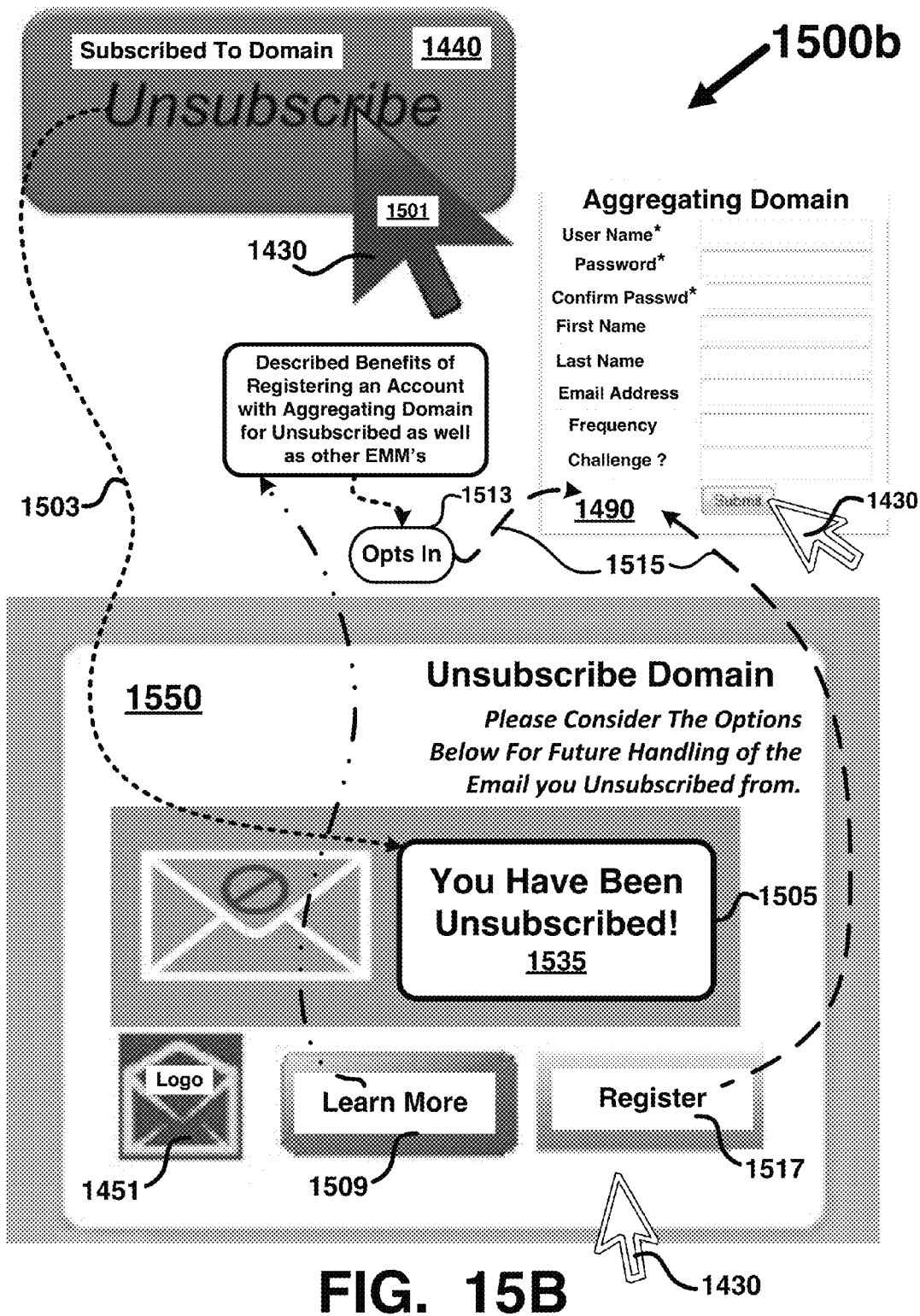
FIG. 15B depicts another example of a scenario for handling an unsubscribe request that may result in registration with an aggregating domain.

Referring now to FIG. 15B, where another example of a scenario 1500b for handling an unsubscribe request that may result in registration with an aggregating domain is depicted. Here, the requester clicking on or otherwise activating an unsubscribed icon or the like, results in the transition 1503 to the unsubscribe domain 1550 where an actual unsubscribing 1535 of the requesters address from the subscribed to domain occurs, as described above in reference to stage 1505. In that the requester's unsubscribe request is fulfilled (e.g., at the stage 1505), the plurality of options (e.g., $1^{st}$ and $2^{nd}$ Options 1509 and/or 1517) are presented to the requester as described above, at the stage 1507. The "Learn More" at the stage 1509 may include a discussion of the benefits of registering with the aggregating domain as described above and the requester may decide to "Opt In" followed by registering a subscription as describe above for the stages 1513 and 1515. Similarly, the requester selecting the $2^{nd}$ Option to "Register" (e.g., at the stage 1517) results in registering a subscription with the aggregating domain 1490 at the stage 1515. The information to be provided by the requester to register the subscription with the aggregating domain may be as described above in reference to FIG. 14B.

EMM's received at address jane_doe@aggregating.domain.com at aggregating domain 1490 as well as any other EMM's received at the same address (e.g., EMM's not resulting from flows 1400*a* and/or 1500*a*) may be processed in to tiles 1251 with content rotation CR for display in grid view 1250 and/or carousel view 1350 as was described above in reference to FIGS. 12A-13D. In some examples, pre-processed tiles 1251 may be received at the aggregating domain 1490 and may not require some or all of the stages described above in reference to flows 1400*a* and/or 1500*a*. A pre-processed tile 1251 may be processed using one or more of the stages described above in reference to flows 1400*a* and/or 1500*a*. Processing of tiles and/or pre-processed tiles 1251 may be by hardware, software, or both. A pre-processed tile 1251 may be a tile 1251 in grid view 1250 or carousel view 1350 that is communicated to another address by activating the "Share" 1289 option described above in reference to FIGS. 12F and 13D, for example. In some applications, the aggregating domain may be socialmail.com as described above, and the address may be john_doe@socialmail.com, for example. In some examples, the domains such as the subscribed to domain, the unsubscribe domain, and the aggregating domain need not be a ".com" and may be a ".org", ".gov", ".biz", ".edu", or other domains without limitation.

Handling of Tiles

Tiles 1251 as described herein may be configured to simplify an amount of interaction required by a user to divine the content type(s) presented in the tile 1251. For example, unlike emails or other EMM's in an inbox or folder of a conventional email system/engine, a user may not want to take actions such as Reply, Forward, Cc, Bcc, or other actions with respect to the tile 1251 and may merely wish to view the content of the tile and then move on to another tile 1251 of interest. Therefore, the ability to Reply, Forward, Cc, Bcc, or take other actions relating to tiles 1251 and their content may be unavailable to the user either by user election (e.g., user configurable settings and/or preferences) or by algorithms operating on the aggregating domain 1490, for example. In some examples, tiles 1251 may persist after being selected for viewing/content rotation CR by a user. In other examples, tiles 1251 may be relegated to a trash can/bin/folder, deleted items, a recycle bin, or the like after being selected for viewing/content rotation CR by a user. In yet other examples, tiles 1251 after being selected for viewing/content rotation CR by a user may be moved out of view on the grid 1250 or carousel 1350 and unviewed tiles 1251 that were not previously in view on the grid 1250 or carousel 1350 may be moved into view to replace already viewed tiles 1251 that were moved out of view. After a tile 1251 is viewed, that tile 1251 may remain in the grid 1250 or carousel 1350 but with an altered or muted appearance that indicates to the user that the user has already viewed that tile 1251.

Although the foregoing examples have been described in some detail for purposes of clarity of understanding, the above-described inventive techniques are not limited to the details provided. There are many alternative ways of implementing the above-described techniques for the present application. The disclosed examples are illustrative and not restrictive.

What is claimed is:

1. A method of reducing churn rate, comprising:
   receiving a request from a requester to unsubscribe from a subscribed to domain;
   directing the requester to an unsubscribe domain;
   unsubscribing an address of the requester from the subscribed to domain;
   presenting to the requester, from the unsubscribe domain, a plurality of options including
   a first option to learn more about an aggregating domain available to the requester to subscribe to and to have content from the subscribed to domain re-directed to a subscription address associated with the requester on the aggregating domain, and
   a second option for the requester to register for a subscription to the aggregating domain, registration operative to establish the subscription address associated with the requester on the aggregating domain and operative to have the content re-directed to the subscription address; and
   executing one of the plurality of options selected by the requester.

2. The method of claim 1, wherein the executing further comprises:
   opting in to subscribe to the aggregating domain; and
   registering the subscription to the aggregating domain.

3. The method of claim 1, wherein the executing further comprises:
   registering the subscription to the aggregating domain.

4. The method of claim 1 and further comprising:
   receiving subscribed to content at the subscription address, the subscribed to content including the content from the subscribed to domain;
   processing the subscribed to content to generate a tile for display in a grid view configured for display on a display system, the tile including content rotation of one or more content types included in the subscribed to content.

5. The method of claim 1 and further comprising:
   receiving subscribed to content at the subscription address, the subscribed to content including the content from the subscribed to domain;
   processing the subscribed to content to generate a tile for display in a carousel view configured for display on a display system, the tile including content rotation of one or more content types included in the subscribed to content.

\* \* \* \* \*